US011086384B2

(12) United States Patent
Lake

(10) Patent No.: US 11,086,384 B2
(45) Date of Patent: Aug. 10, 2021

(54) SYSTEM, APPARATUS AND METHOD FOR LATENCY MONITORING AND RESPONSE

(71) Applicant: Intel Corporation, Santa Clara, CA (US)

(72) Inventor: Christopher Lake, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/688,452

(22) Filed: Nov. 19, 2019

(65) Prior Publication Data

US 2021/0149472 A1  May 20, 2021

(51) Int. Cl.
*G06F 1/3234* (2019.01)

(52) U.S. Cl.
CPC .................. *G06F 1/3234* (2013.01)

(58) Field of Classification Search
CPC .................................................... G06F 1/3234
See application file for complete search history.

(56) References Cited

U.S. PATENT DOCUMENTS

| 9,235,251 | B2 * | 1/2016 | Gargash | G06F 1/324 |
| 10,025,370 | B2 * | 7/2018 | Henriques | G06F 1/3253 |
| 10,055,369 | B1 * | 8/2018 | Tucker | G06F 9/5038 |
| 2010/0169684 | A1 | 7/2010 | Jeyaseelan et al. | |
| 2012/0210032 | A1 * | 8/2012 | Wang | G06F 13/24 |
| | | | | 710/260 |
| 2012/0324265 | A1 * | 12/2012 | Jeyaseelan | G06F 1/325 |
| | | | | 713/320 |
| 2013/0007492 | A1 | 1/2013 | Sokol, Jr. et al. | |
| 2013/0007494 | A1 * | 1/2013 | Branover | G06F 1/3203 |
| | | | | 713/323 |
| 2014/0006824 | A1 * | 1/2014 | Maciocco | G06F 1/3203 |
| | | | | 713/323 |
| 2014/0173306 | A1 * | 6/2014 | Cooper | G06F 1/3268 |
| | | | | 713/320 |

(Continued)

OTHER PUBLICATIONS

Scott Knowlton, "Reducing Power Consumption in PCI Express-based Devices," Synopsys, 5 pages, Jun. 25, 2019.

(Continued)

*Primary Examiner* — Vincent H Tran
(74) *Attorney, Agent, or Firm* — Trop, Pruner & Hu, P.C.

(57) ABSTRACT

One embodiment includes hardware logic to: receive first and second communications corresponding to an intellectual property (IP) core and begin a timed session in response to receiving the second communication; determine the firmware has completed processing the second communication before expiration of the timed session and increase a latency state corresponding to a resource in response to determining the firmware has completed processing the second communication before expiration of the timed session; receive a third communication corresponding to the IP core and begin an additional timed session in response to receiving the third communication; determine the firmware failed to complete processing the third communication before expiration of the additional timed session and decrease the latency state corresponding to the resource in response to determining the firmware failed to complete processing the third communication before expiration of the additional timed session.

25 Claims, 21 Drawing Sheets

(56) References Cited

U.S. PATENT DOCUMENTS

| | | | | |
|---|---|---|---|---|
| 2014/0181334 A1* | 6/2014 | Jeyaseelan | ............... | G06F 13/10 710/18 |
| 2014/0181563 A1* | 6/2014 | Songer | ................. | G06F 1/3203 713/340 |
| 2014/0189391 A1* | 7/2014 | Jeyaseelan | ............ | G06F 1/3234 713/320 |
| 2014/0258749 A1* | 9/2014 | Wamg | .................... | G06F 1/3234 713/320 |
| 2014/0372777 A1* | 12/2014 | Reller | .................... | G06F 13/161 713/320 |
| 2015/0052404 A1* | 2/2015 | Henriques | ............. | G06F 1/3215 714/43 |
| 2015/0227476 A1* | 8/2015 | Murphy | .................. | G06F 13/24 710/267 |
| 2015/0363116 A1* | 12/2015 | Govindan | ............. | G06F 1/3225 713/320 |
| 2016/0041595 A1* | 2/2016 | Cooper | ................. | G06F 1/3234 713/320 |
| 2016/0231958 A1* | 8/2016 | Chin | ....................... | G06F 3/0634 |
| 2017/0344498 A1* | 11/2017 | Voor | ...................... | G06F 13/385 |
| 2019/0041959 A1* | 2/2019 | Pappu | ..................... | G06F 13/42 |

OTHER PUBLICATIONS

Wikipedia, "Firmware," Jun. 6, 2019, 7 pages.
Intel Corporation, "Device Guidances for PCI Express Technology Extensions," Jun. 3, 2019, 31 pages.
Margaret Rouse, Whatis.com.com, "IP Core, Intellectual Property Core," Jun. 25, 2019, 1 page.
Wikipedia, "Platform Controller Hub," Jun. 25, 2019, 6 pages.
Scott Knowlton, et al., Synopsys, "Using L1 Sub-States to Reduce Power Consumption in PCI Express-Based Devices," Jun. 25, 2019, 9 pages.
Wikipedia, "Semiconductor intellectual property core," Jun. 25, 2019, 4 pages.
Wikipedia, "Switched Fabric," Jun. 25, 2019, 2 pages.
Author Unknown, "PCIE Tutorial: Hardware Oriented ASPM Link State and L1 Substates," 6 pages, Jun. 3, 2019.
Wiki Semiconductor and Computer Engineering, "Microarchitectures—Intel—Wikichip," Jul. 19, 2019, 34 pages.
European Patent Office, Office Action dated Jun. 24, 2021 in European Patent Application No. 20195527.5 (11 pages).

* cited by examiner

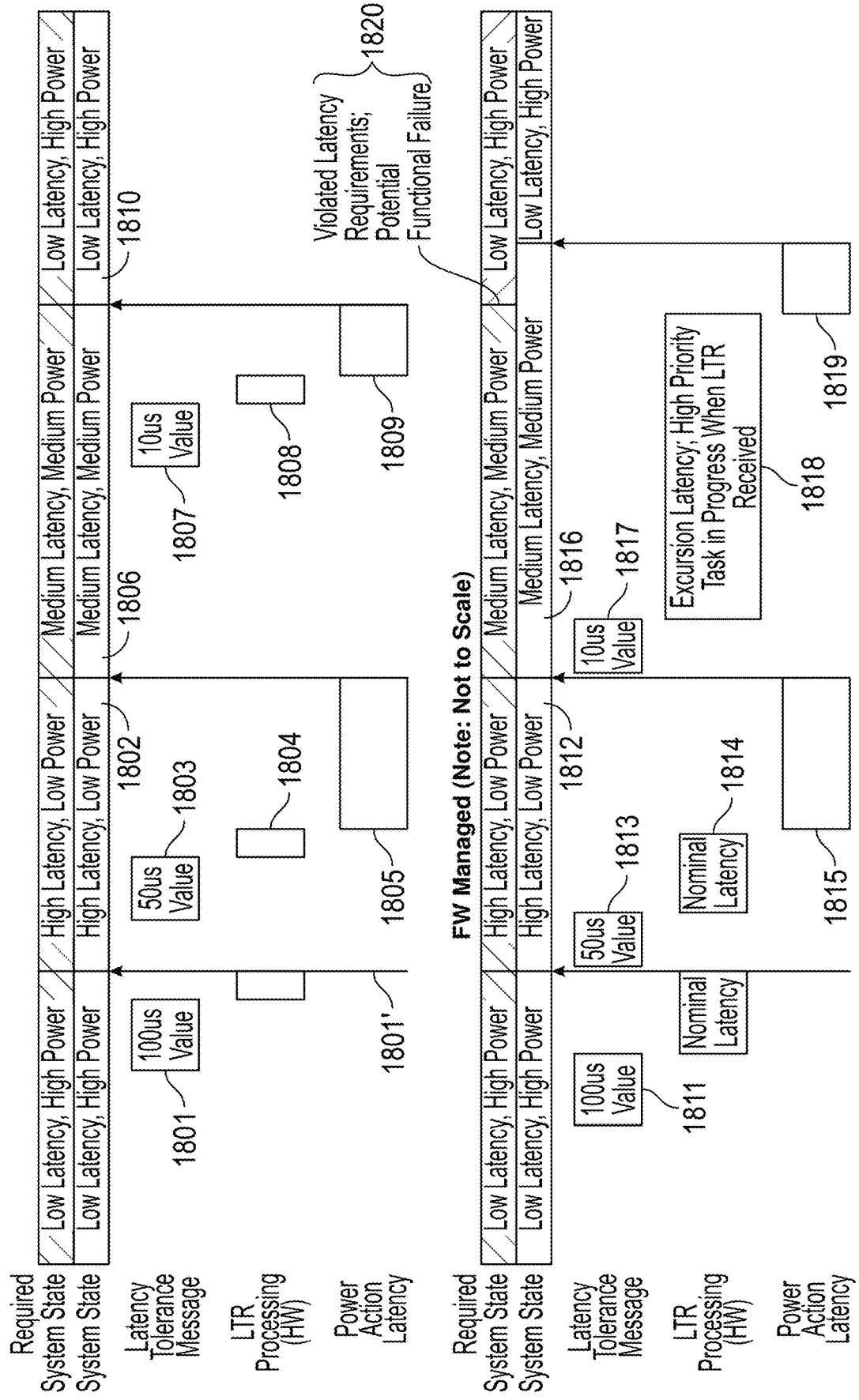

US 11,086,384 B2

SYSTEM, APPARATUS AND METHOD FOR LATENCY MONITORING AND RESPONSE

TECHNICAL FIELD

Embodiments relate to power management of integrated circuits.

BACKGROUND

Advances in semiconductor processing and logic design have permitted an increase in the amount of logic that may be present on integrated circuit devices. As a result, computer system configurations have evolved from single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, Internet-of-things components, etc. become even more prevalent (from inclusion in the typical computer, automobiles, and televisions to biotechnology).

BRIEF DESCRIPTION OF THE DRAWINGS

FIGS. 18A-1 and 18A-2 are timing diagrams illustrating various methods for handling latency reporting.

DETAILED DESCRIPTION

Figure 1:
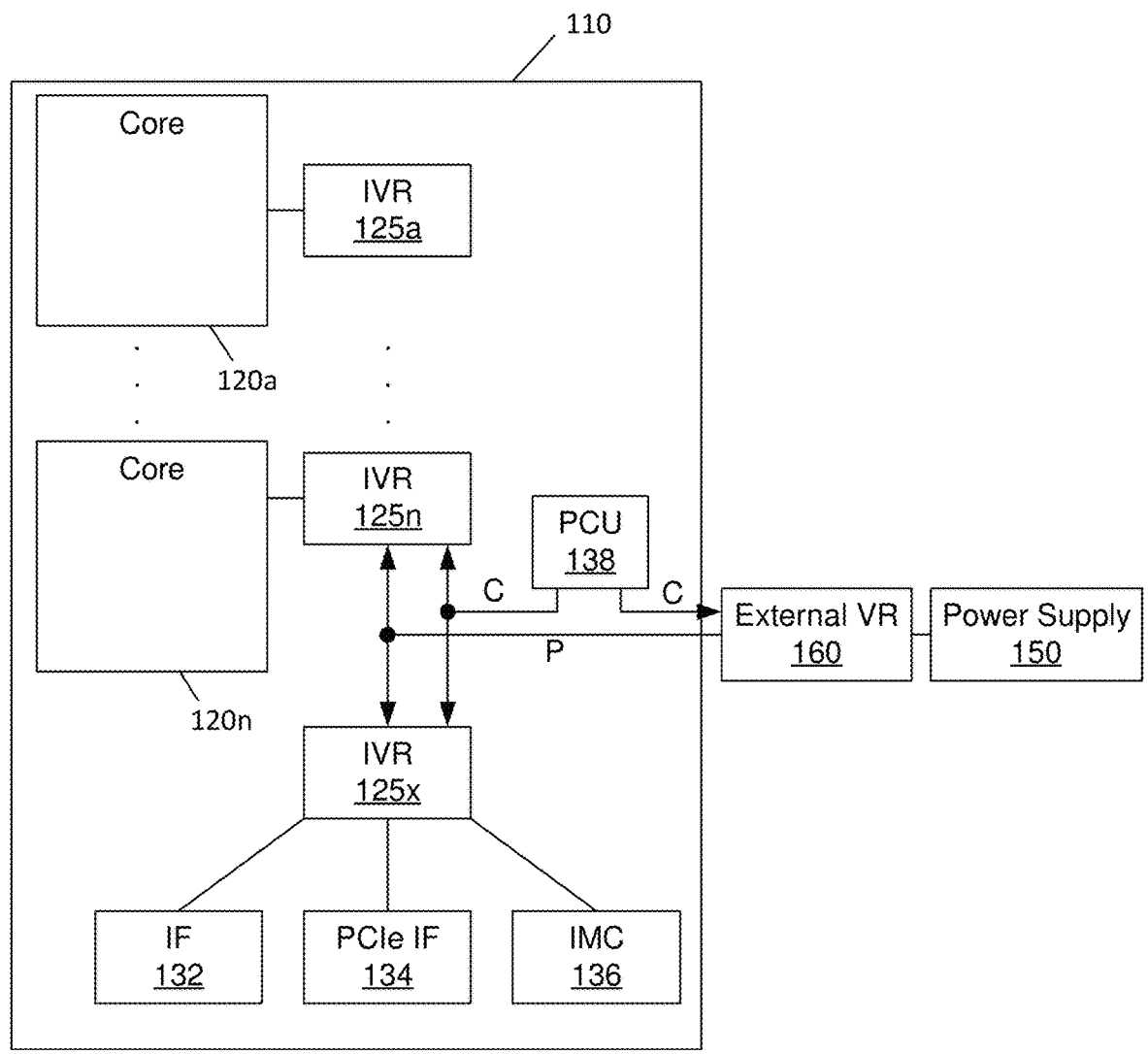
FIG. 1 is a block diagram of a portion of a system in accordance with an embodiment of the present invention.

Latency Tolerance Reporting (LTR) helps address the above-mentioned need for energy efficiency and conservation associated with integrated circuits. As addressed more fully in, for example, PCI Express® Base Specification Revision 2.1 (Mar. 4, 2009), the LTR mechanism enables endpoints to report their service latency requirements to another entity (e.g., a power management controller (PMC)), so that power management policies for central platform resources (e.g., memory, clock source such as a phase lock loop (PLL), voltage rail) can be implemented to consider service requirements for the endpoints. (LTR transmission is not limited to PCI Express® or PCI Express® endpoints. PCI Express® is merely used as an example. LTR technology may be used more generally in various intellectual property blocks or cores within an SoC, such as a PMC).

An endpoint may include, for example, an Intellectual Property (IP) core. An IP core is a block of logic or data that is used in making, for example, a field programmable gate array (FPGA) or application-specific integrated circuit (ASIC) for a product. As essential elements of design reuse, IP cores are part of the growing electronic design automation (EDA) industry trend towards repeated use of previously designed components (although as used herein, there need be no element of design reuse). An IP core may be entirely portable so that it is easily inserted into any vendor technology or design methodology. Universal Asynchronous Receiver/Transmitter (UARTs), central processing units (CPUs), Ethernet controllers, PLLs, and PCI interfaces are all examples of IP cores. IP cores may include, for example, hard cores, firm cores, or soft cores. Hard cores are physical manifestations of the IP design. Like the hard cores, firm (sometimes called semi-hard) cores also carry placement data but are configurable to various applications. Soft cores exist as, for example, a netlist (a list of the logic gates and associated interconnections making up an integrated circuit), hardware description language (HDL) code, and the like.

An LTR message may include, for example, a 16 bit message with fields to indicate what type of requests (e.g., a memory read) the LTR relates to as well as the magnitude of tolerancy (e.g., 1 ns to millions of ns) the device (e.g., IP core) has for a target resource (e.g., PLL). (A 16 bit message is merely an example for illustrative purposes and other embodiments may include 32 bit LTR messages with varying numbers of fields and the like). The magnitude may be, for example, 0 ns if the device cannot tolerate latency for the resource. Devices with latency tolerance may send multiple LTRs to a host or power manager (e.g., PMC) as conditions change for the device. For example, a requirement for sustained data transmission may lower latency tolerance for the device whereas projected idle periods may increase latency tolerance for the device. As another example, a change to any component or contributing member of a conglomerated LTR may necessitate a new LTR. Some specifications explicitly provide that devices transmit an updated LTR Message each time the device's service requirements change.

In short, an LTR Message from a device reflects the tolerable latency for a resource from the perspective of the device. With the above-mentioned specification, the service latency itself is defined as follows: if the device issues a Read Request, latency is measured as delay from transmission of the END symbol in a request packet to the receipt of the STP symbol in the first completion packet. With other technologies the latency may be measured differently.

Various rules may dictate LTR handling. For example, when the latency requirement is updated, it may be required that the updated latency figure be comprehended (e.g., by the PMC) no later than the larger of either: (a) waiting as long as the previously indicated latency, or (b) following the servicing of a subsequent request. For instance, if the latency tolerance is being reduced, some specifications may recommend transmitting the updated LTR message ahead of the first anticipated request (e.g., a memory request) with the new requirement, allowing the amount of time indicated in the previously issued LTR Message. If the tolerance is being increased, then some specifications may provide that the update should immediately follow the final request with the preceding latency tolerance value.

Having accurate LTR handling is important for many reasons. For example, a PMC may delay processing of device requests, provided it satisfies the device's service requirements. If, for example, an IP circuit connected to port1 reports a latency tolerance of 100 µs, and an IP circuit on port2 reports a latency tolerance of 30 µs, the PMC might implement a policy of stalling an initial request following an idle period from port1 for 70 µs before servicing the request with a 30 µs latency from port2. This PMC behavior provides the PMC the ability to batch together requests for more efficient servicing. As another example of why accurate LTR handling is important, clock sources, voltage rails, and fabrics can each have distinct latency tolerance values reported by IP circuits. And a system on a chip (SoC) agent (e.g., PMC) may limit its power savings actions to those that can be undone in less than the shortest reported latency tolerance value. For instance, if a PLL transitions from off to on in 10 µs, all agents which express latency tolerance with respect to that PLL's availability must have reported a latency tolerance of >=10 µs or the PMC cannot allow the PLL to turn off.

The processing of LTRs may be handled in various ways. For example, hardware or firmware may be tasked with receiving LTRs and publishing LTRs to various components. However, Applicant has determined firmware management of latency-sensitive tasks can be problematic due to both inherent slowness (relative to a hardware implementation of the same actions) and due to interrupts/task switching requirements for the firmware. However, the flexibility of a firmware solution provides sufficient value to warrant implementing such tasks in firmware.

The identification and explanation of the problem and corresponding solutions are discussed more thoroughly with regard to FIGS. 17A, 17B, 18A-1, 18A-2. However, FIGS. 1-16 and power management are first addressed before proceeding to a discussion of FIGS. 17A, 17B, 18A-1, 18A-2.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel®. Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. In an embodiment a PCU may be a dedicated microcontroller that runs dedicated embedded firmware and makes dynamic power management decisions based on various global inputs such as temperature, current, power, and workload types. PCU 138 may couple to a platform power management controller (PMC). One example of a PMC is the separate power management integrated circuit (PMIC) of FIG. 12. Another example of a PMC is the PMC of FIG. 19. PCU 138 may couple directly to a PMC by, for example, an I2C bus and/or a voltage control (e.g., SVID) bus.

As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases, a hierarchical power management architecture may be provided, with PCU 138 in communication with corresponding power management agents associated with each of cores 120.

One power management logic included in PCU 138 may be a dynamic current sharing control circuit that is configured to dynamically determine independent maximum current consumption values for each core 120 and/or additional processing circuits. As will be described further herein this control circuitry may provide a dynamically configurable maximum current consumption value to each of cores 120 to enable each core 120 to operate according to this constraint. As such, when PCU 138 identifies a condition that triggers a throttle event, a throttle signal may be sent to the cores 120. In turn, each core 120 may limit its operation to its dynamically identified maximum current consumption value. In this way, different cores may operate at asymmetric performance states, particularly when a throttle event is identified, such that a minimal impact to user-facing workloads occurs.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. Embodiments described herein may enable dynamic changes to the guaranteed frequency of the P1 performance state, based on a variety of inputs and processor operating parameters. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
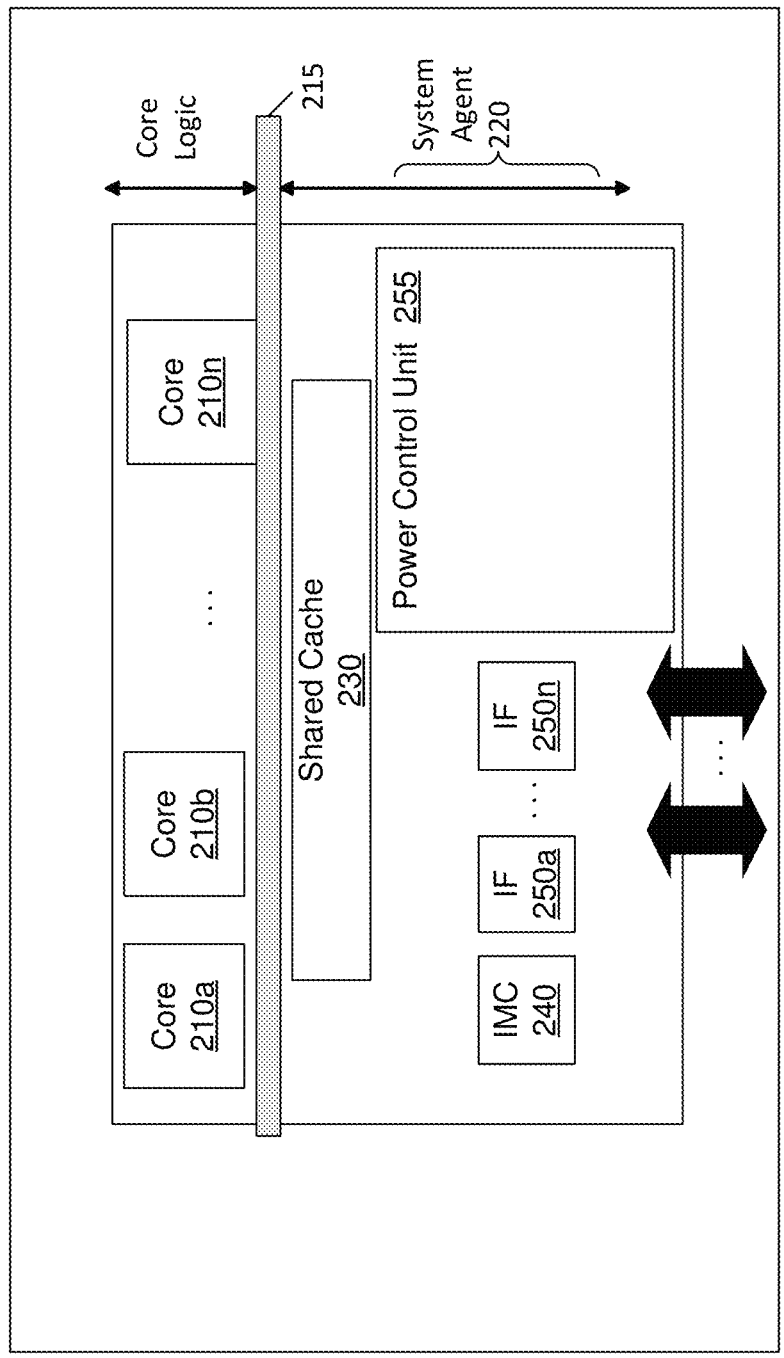
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
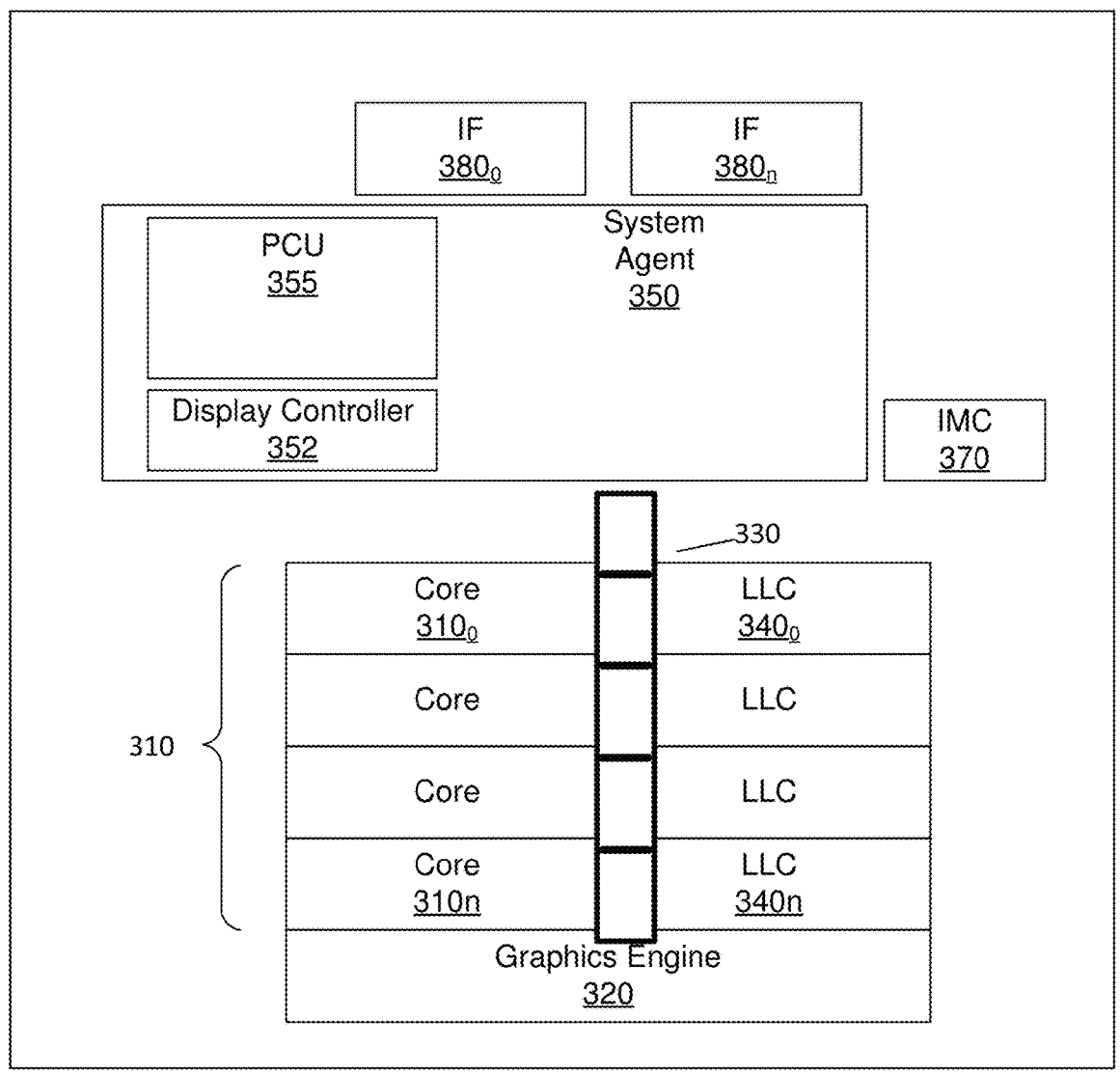
FIG. 3 is a block diagram of a multi-domain processor in accordance with an embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However, in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
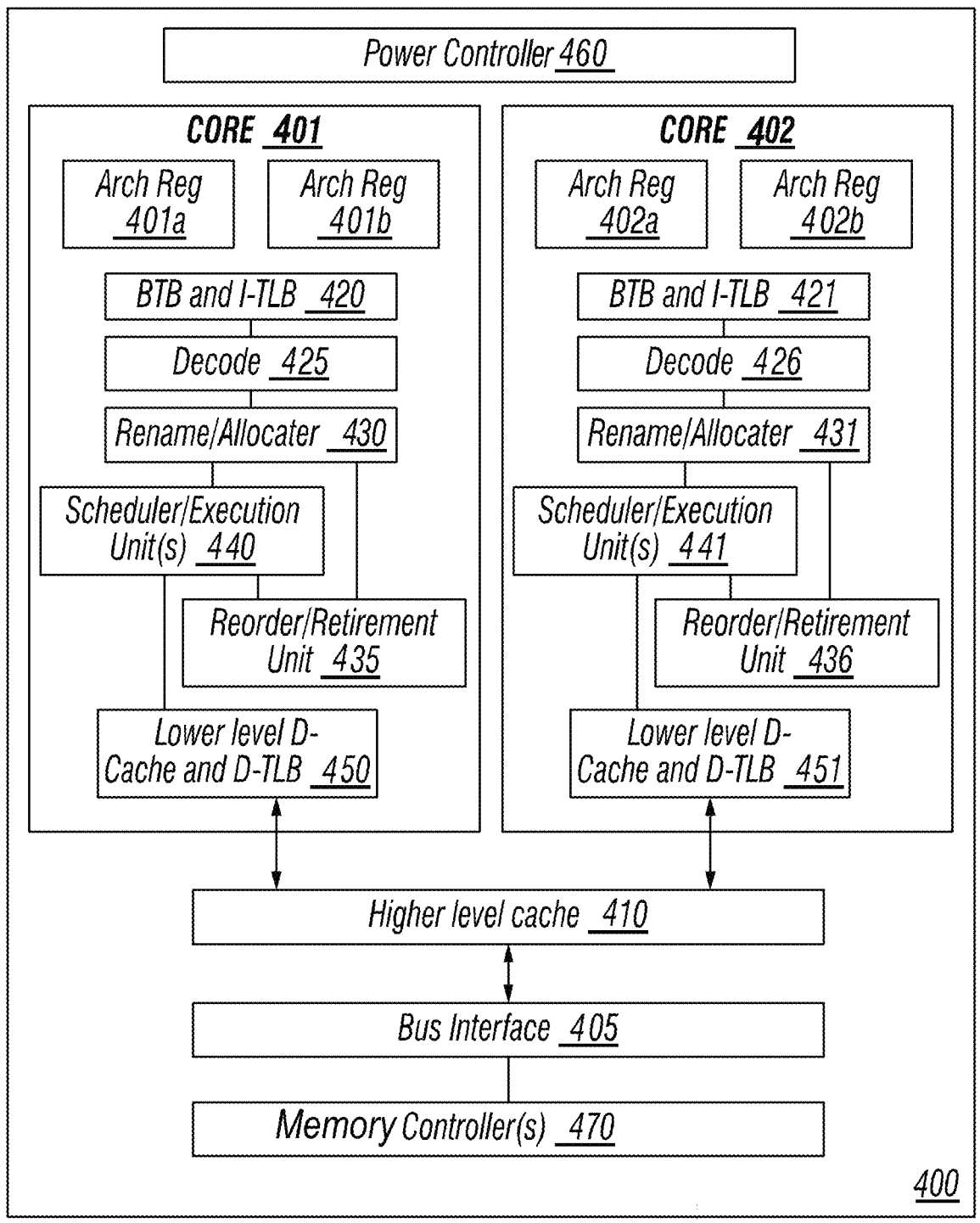
FIG. 4 is a block diagram of a processor including multiple cores in accordance with an embodiment of the present invention.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
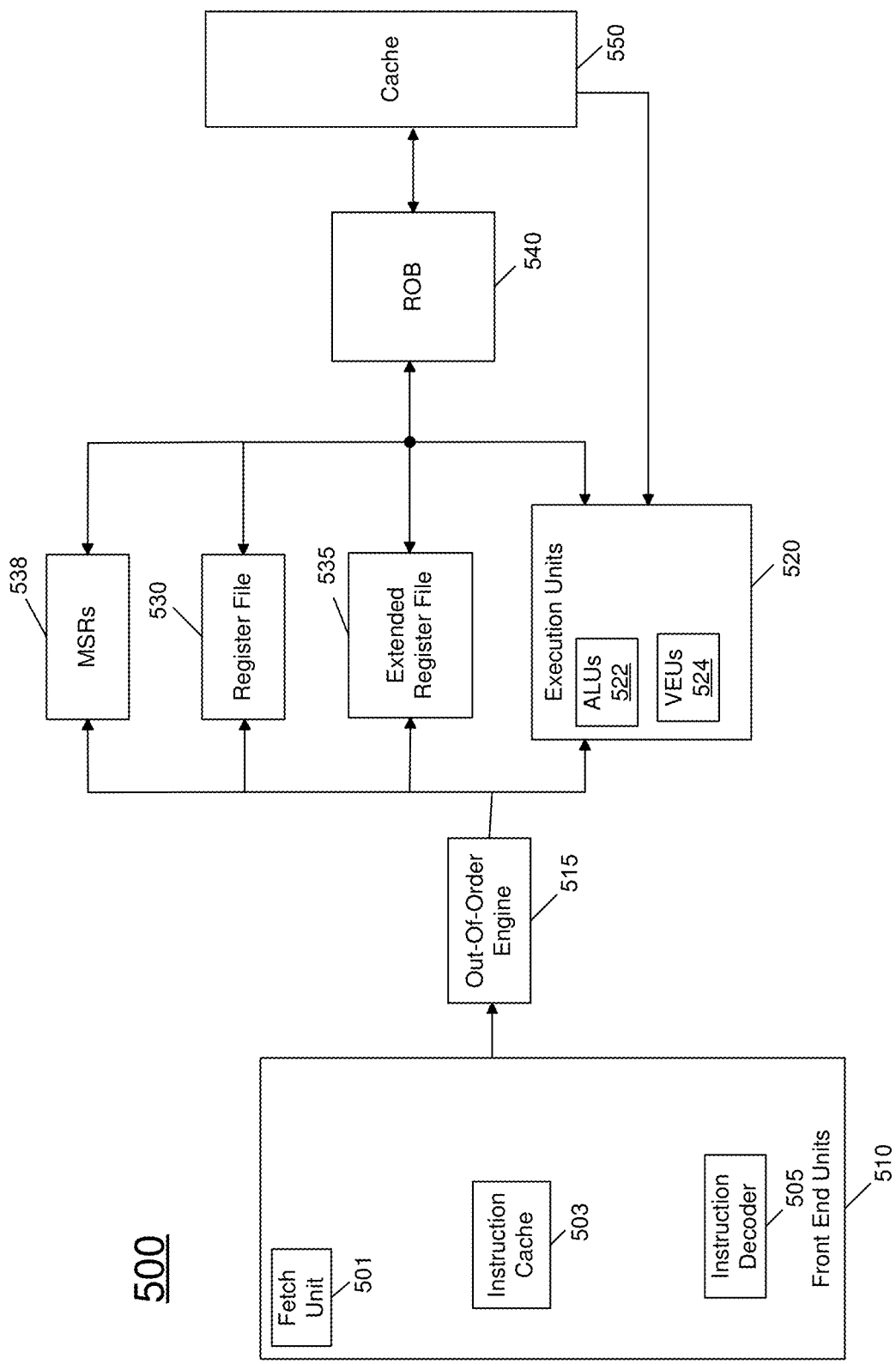
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
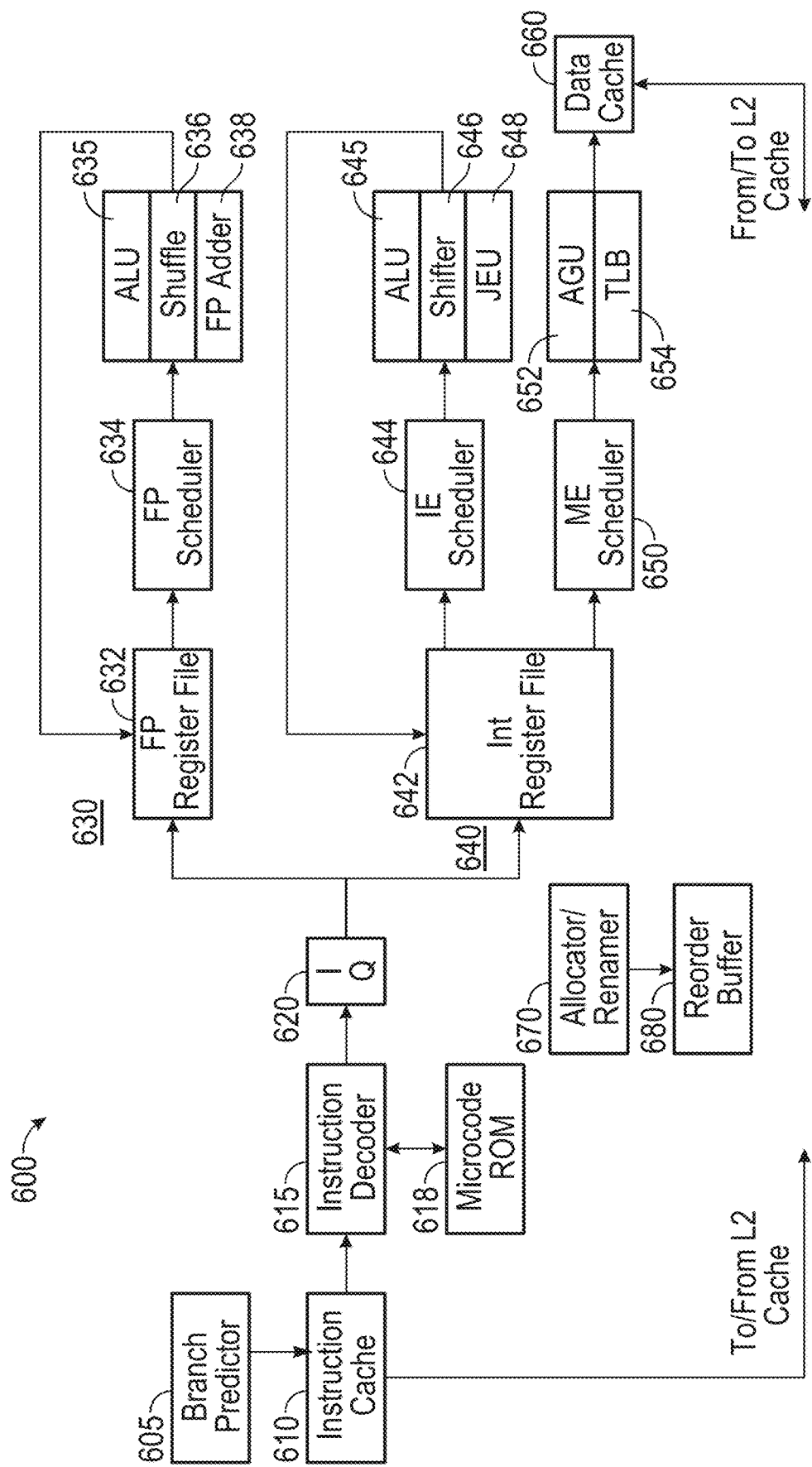
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel®. Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course, understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course, understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
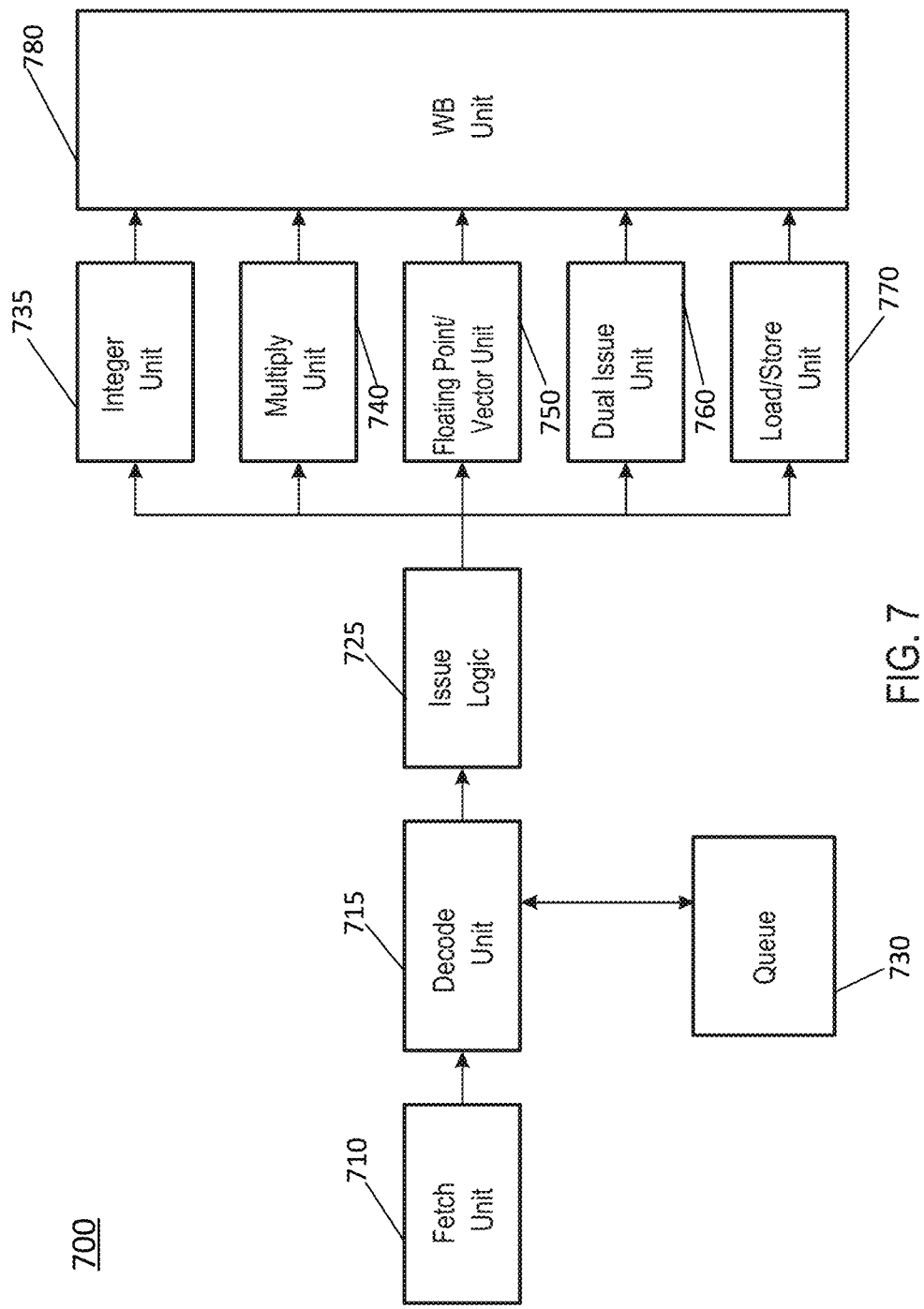
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
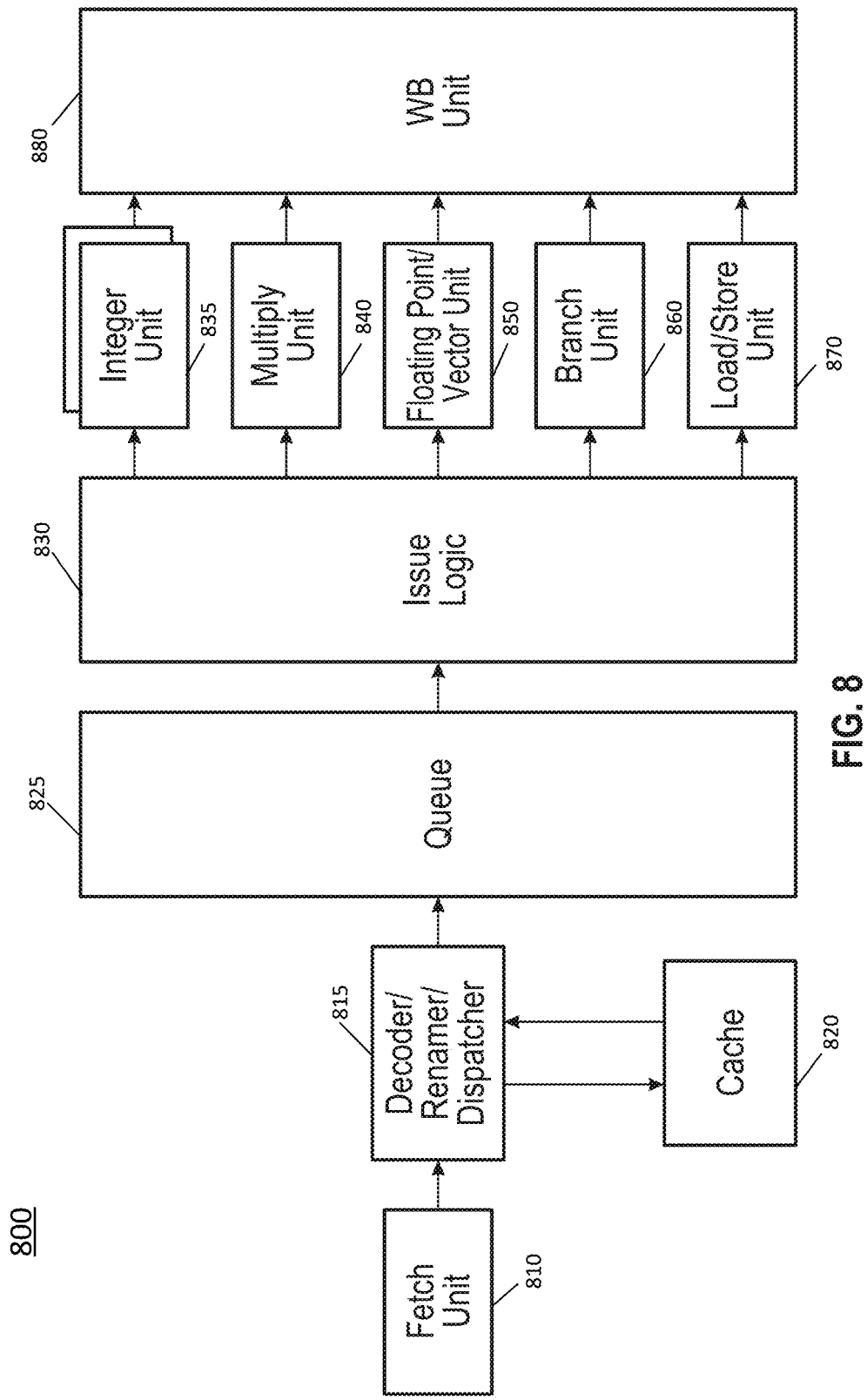
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
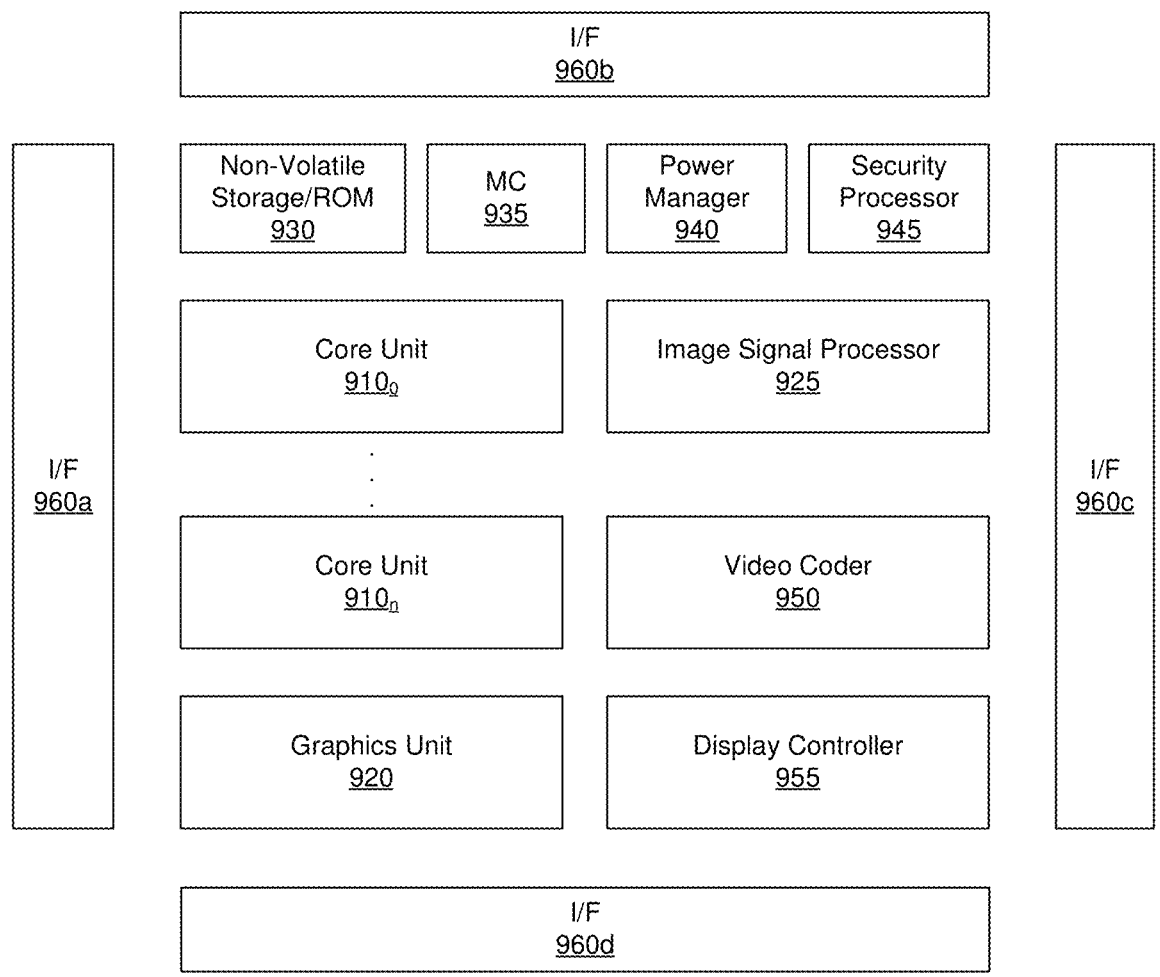
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device or connected device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
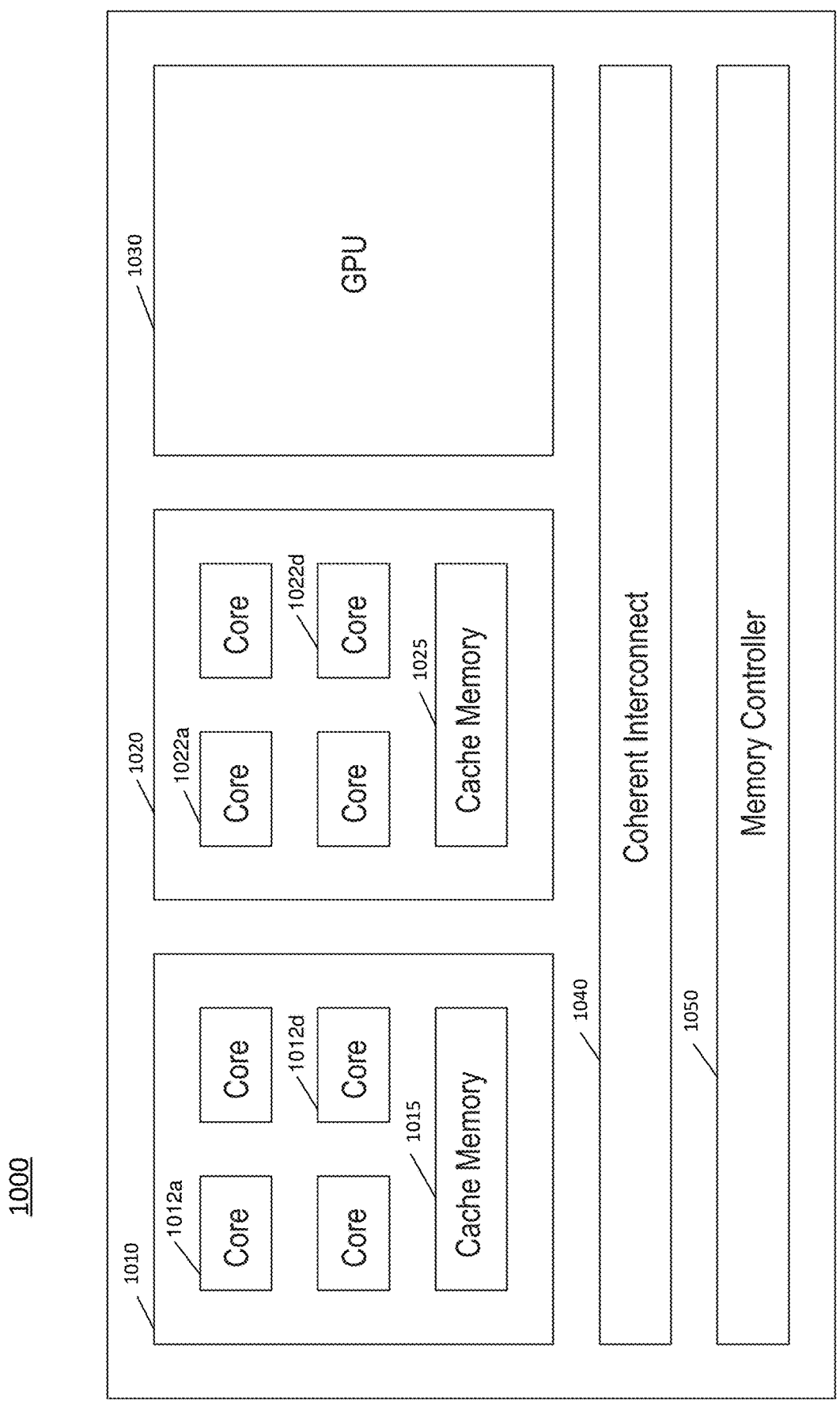
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
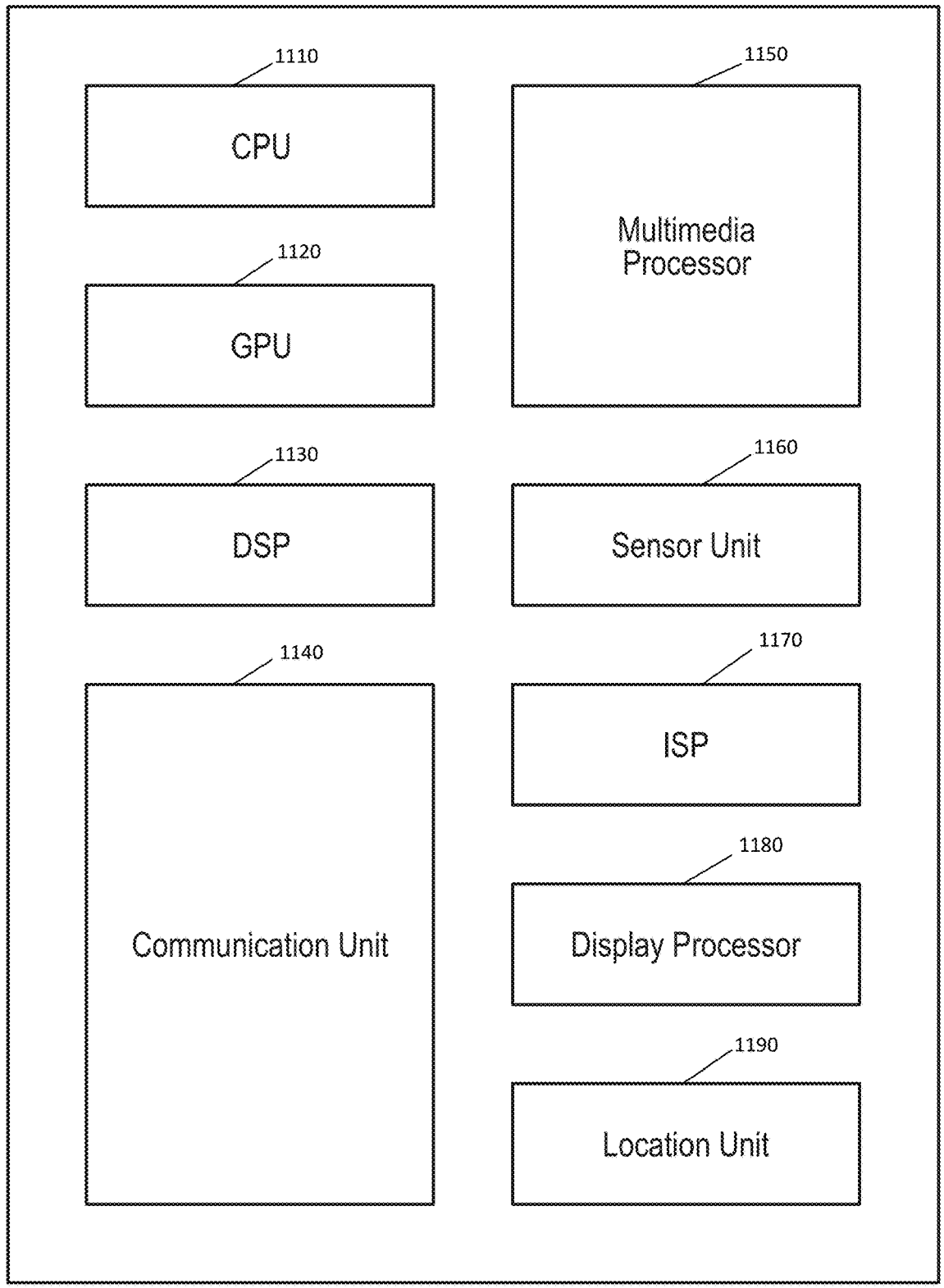
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
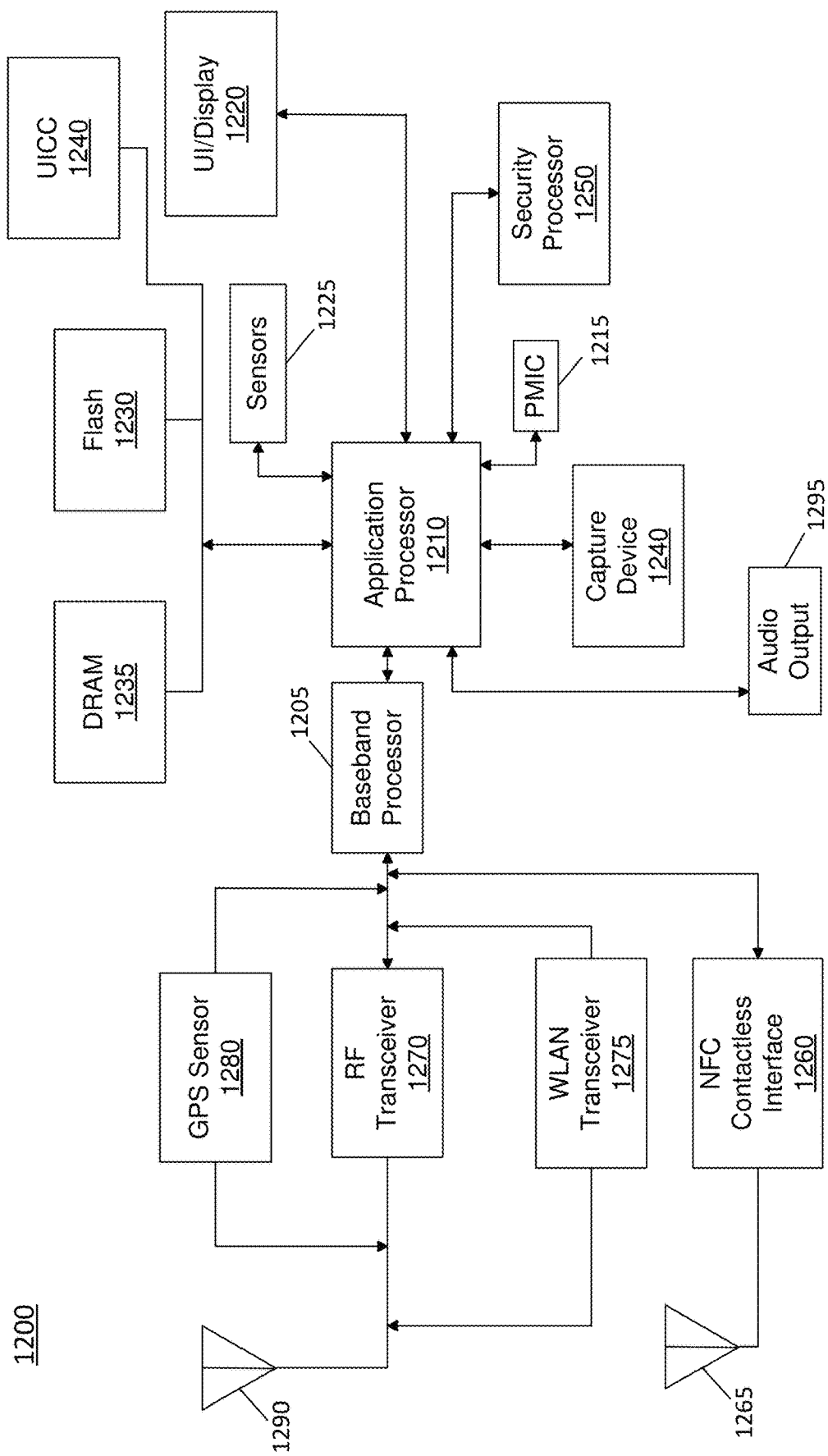
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and perform the power management techniques described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in an NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition, a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
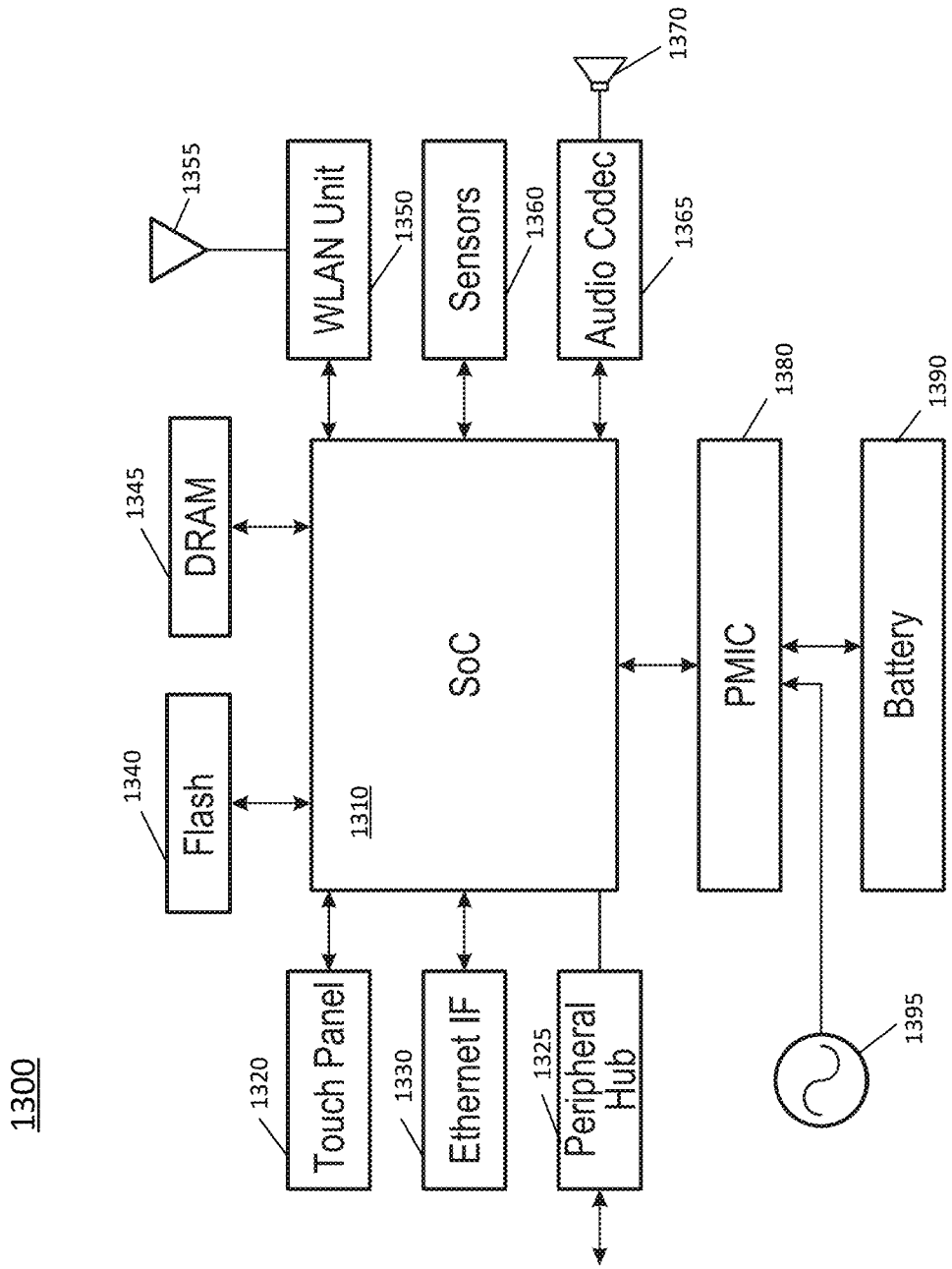
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and perform the power management techniques described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course, understand that while shown with this particular implementation in FIG. 13, many variations and alternatives are possible.

Figure 14:
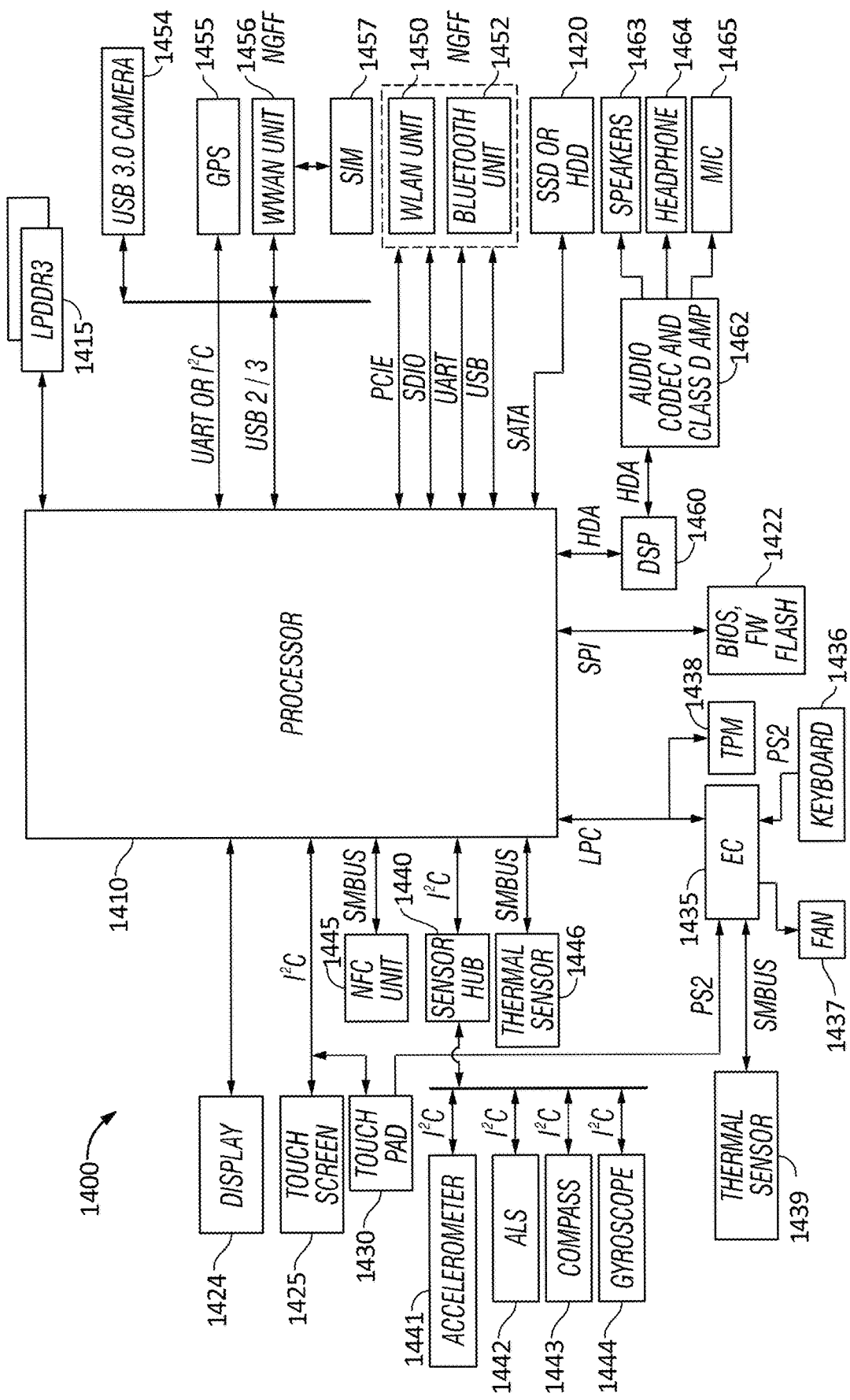
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$_{2C}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via an NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
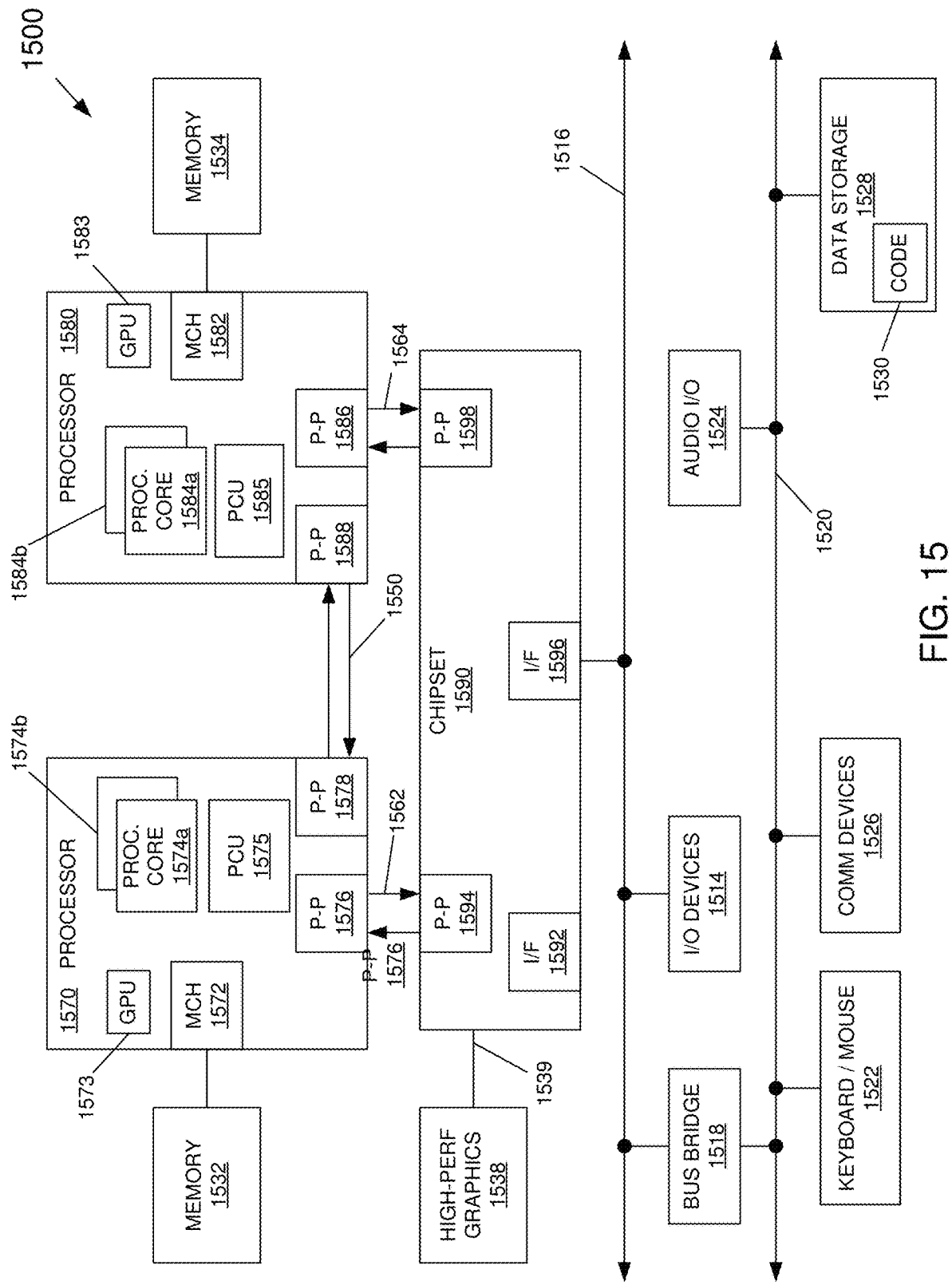
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574a and 1574b and processor cores 1584a and 1584b), although potentially many more cores may be present in the processors. In addition, each of processors 1570 and 1580 also may include a graphics processor unit (GPU) 1573, 1583 to perform graphics operations. Each of the processors can include a PCU 1575, 1585 to perform processor-based power management.

Still referring to FIG. 15, first processor 1570 further includes a memory controller hub (MCH) 1572 and point-to-point (P-P) interfaces 1576 and 1578. Similarly, second processor 1580 includes an MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
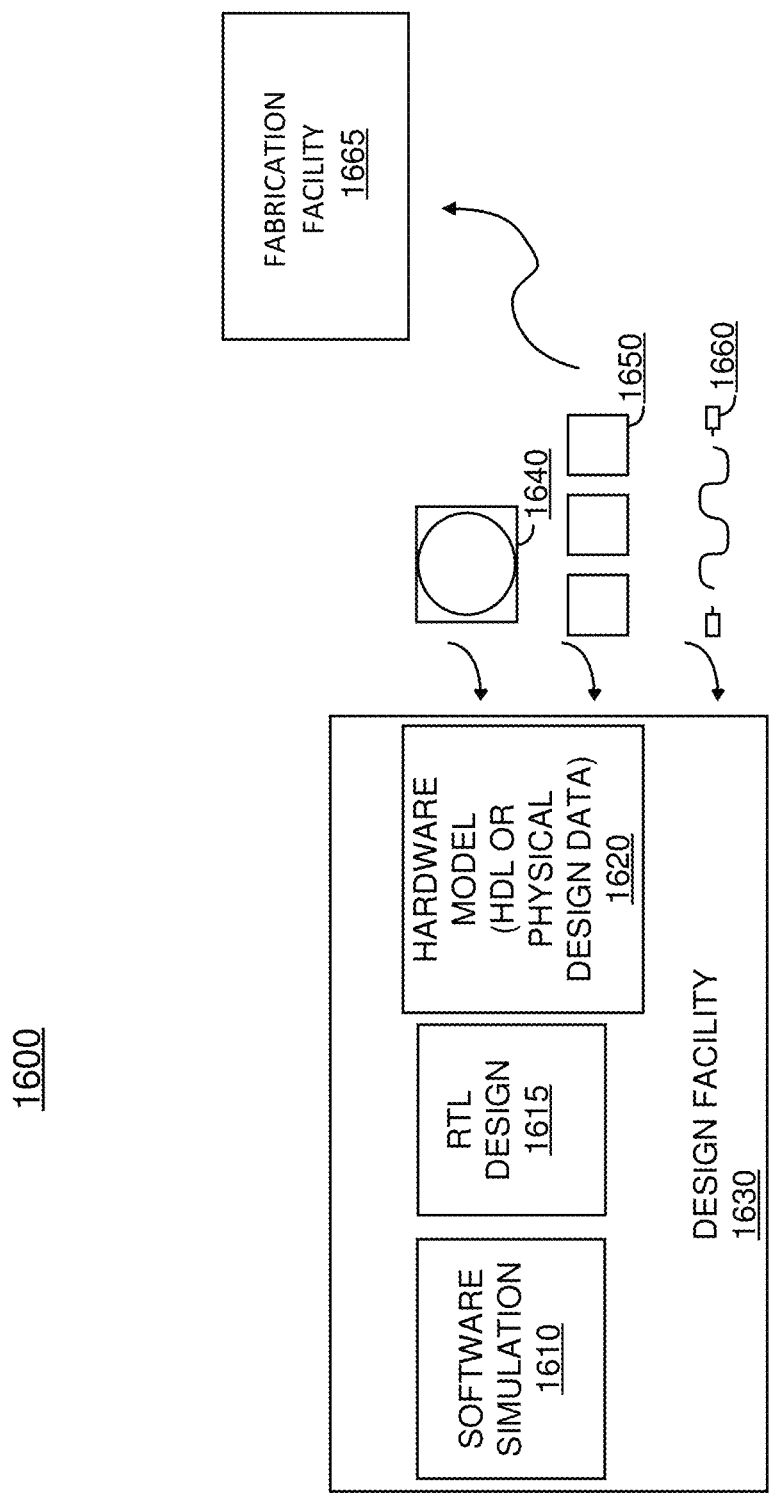
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

As mentioned above before the discussion of FIGS. 1-16, Applicant determined the use of the LTR mechanism implemented with firmware may add latency, due to firmware processing, that leads to poor performance when an IP circuit or device has to wait longer desirable for a resource. However, an embodiment of the invention provides the firmware (which processes the LTR) with a hardware "backstop", with hardware tracking the basic trigger and completion of firmware actions. The hardware takes simple corrective actions specific to the task if the firmware takes longer than allowed to complete the task or tasks.

An example helps illustrate the issue identified by Applicant. A scenario exists where an IP circuit's previously reported LTR for a PLL was 100 µs. The SoC has turned off the PLL, which takes 80 µs to turn back on (because 80 µs is less than 100 µs). This is legal. The IP circuit delivers a new 20 µs LTR, with the SoC being allowed 100 µs (which is the value of the old LTR value) to undo previous power actions before the new LTR starts to be honored. In other words, the LTR mechanism may follow a rule such that a component's new LTR is only guaranteed to take effect after the "old LTR" amount of time has transpired. This rule exists considering the SoC may have taken actions that require the old LTR time to exit. In this scenario, the IP circuit or core requests the PLL right when the new 20 µs LTR should be in effect (i.e., 100 µs after the new LTR was sent). The SoC would, then, be allowed 20 µs (new LTR) to make the PLL available (or 120 µs after the new LTR was received). But in this scenario the firmware was busy with an unrelated task when the new LTR message arrived, so the firmware cannot finish processing the new LTR for, as an example, 100 µs—whereas if no delay would have occurred the firmware may have finished processing the new LTR at 15 µs after receiving the new LTR and then immediately started the process to waken the PLL. In other words, with no firmware delay a decision to start the PLL would have commenced, for example, 15 µs after the new LTR was received instead of 100 µs after the new LTR. However, with the 100 µs delay the undoing of power actions starts to take place concurrently with the IP requesting the PLL (i.e., 100 µs after the LTR was received) whereas it should have happened 15 µs after the LTR was received (but for the 100 µs delay) to ensure the PLL was completely back on before the 100 µs "undoing allotment/old LTR" and new 20 µs had collectively expired. As mentioned above, the PLL takes 80 µs to turn on. And because in this scenario (where the firmware was delayed 100 µs) the firmware starts to turn on the PLL at 100 µs after the LTR was received and while a 20 µs LTR should be in effect, the PLL turn on takes: "PLL turn on time"–"new LTR"=(80 µs–20 µs)=60 µs longer than the new, now in effect, LTR of 20 µs can allow.

Figures 2, 18A:
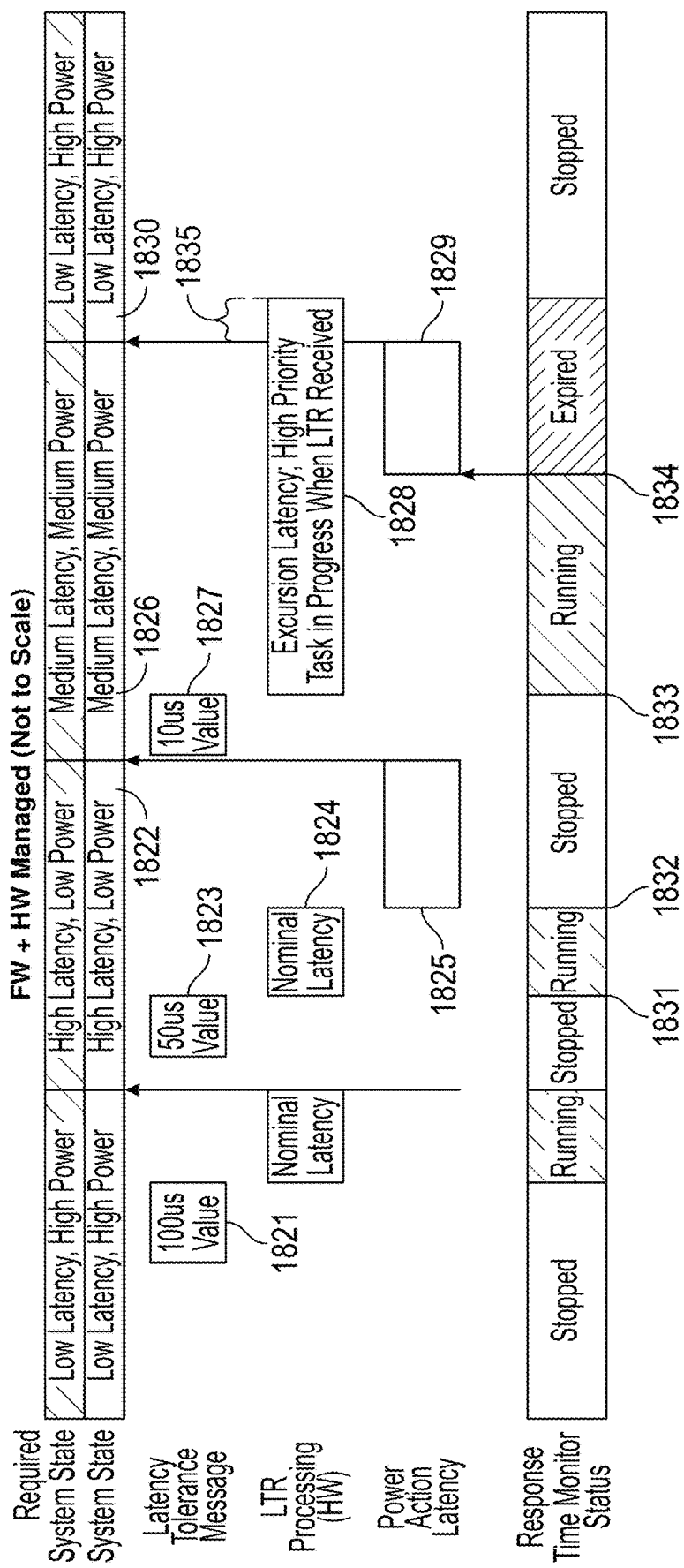

To further explain the problems with firmware handling LTRs, consider FIGS. 18A-1 and 18A-2.

The top of FIG. 18A-1 (not to scale) addresses a scenario where LTR processing is handled by hardware, such as an SoC. The scenario is that the previously reported LTR 1801 (sent from an IP circuit to the SoC's power management agent) was 100 µs. As a result, the SoC has turned off a resource (1802) (e.g., PLL) that takes 80 µs to turn back on. The amount of time 1801' to lower power/increase latency may be minimal. This is legal. The IP circuit then sends a new LTR 1803 with a 50 µs latency. The SoC processes the LTR for a time 1804 and then changes the latency/power level over another period of time 1805. This results in a new latency/power state 1806. This is legal. The IP circuit then sends a new LTR 1807 with a 10 µs latency. The SoC processes the LTR for a time 1808 and then changes the latency/power level over another period of time 1809. This results in a new latency/power state 1810. This is legal.

The bottom of FIG. 18A-1 (not to scale) addresses a scenario where LTR processing is handled by firmware, instead of hardware, such as an SoC. The scenario is that the previously reported LTR 1811 (sent from an IP circuit to the firmware) was 100 µs. As a result, the firmware has directed the SoC to turn off a resource (1812) (e.g., PLL) that takes 80 µs to turn back on. This is legal. The IP circuit then sends a new LTR 1813 with a 50 µs latency. The firmware processes the LTR for a time 1814 and then changes the latency/power level over another period of time 1815. This results in a new latency/power state 1816. This is legal. The IP circuit then sends a new LTR 1817 with a 10 μs latency. The SoC processes the LTR for a time 1818. However, the firmware was already busy with another task (unrelated to processing LTR 1817) and could not turn to process the LTR for some time, which results in a prolonged processing time 1818. By the time the LTR is processed by the firmware and changing the latency/power level over another period of time 1819 begins, a state violation has occurred 1820. This failure of firmware to complete the tasks within the allowed time may result in a bad user experience potentially including loss of use of the system and/or data loss due to conditions such as buffer overflows or underruns.

The amount of time assumed for the firmware to process an LTR could be increased to cover the rare longest latency. But doing so could substantially limit the scenarios under which various resources, including PLL A, can be subjected to power savings operations. Also, the likelihood of encountering the above-mentioned rare latency for the firmware is very low. Consequently, the power penalty would be applied in 99% of cases while it only takes effect 1% of the time.

Instead of the above overly cautious approach to ensuring firmware delays do not result in latency issues, an embodiment of the invention provides a hardware "backstop", with hardware tracking only the basic trigger and completion of firmware actions, taking simple, corrective actions specific to the task if firmware takes longer than allowed to complete the task or tasks.

In an embodiment of the invention the firmware communicates to hardware (e.g., power controller) nominal processing latency. The hardware starts a counter when the new LTR is received. If the firmware has not processed the new LTR within the nominal processing time (again a very rare case), the hardware will bring the SoC to a high power, low latency state as a means to ensure LTRs will not be violated. Thus, in the above scenario the nominal firmware processing time may have been 15 μs (instead of 100 μs). So, 15 μs after the new message arrived, hardware will move the SoC to a low latency state, including turning on PLL A (which takes 80 μs to restart). So, the 15 μs sum of the latencies (e.g., 10 μs for the firmware to process the LTR and a 5 μs fabric transmission overhead) and 80 μs PLL startup time (80 μs) would be 95 μs, which is less than the previously reported 100 μs LTR. In the normal case, the firmware will be able to process the LTR within the nominal time (15 μs in the above scenario) so the SoC is not artificially brought to the low latency state.

FIG. 18A-2 (not to scale) addresses an embodiment of the invention where LTR processing is handled by firmware and hardware, such as an SoC. The scenario is that the previously reported LTR 1821 (sent from an IP circuit to the SoC's power management agent and firmware) was 100 μs. As a result, the SoC and firmware have turned off a resource (1822) (e.g., PLL) that takes 80 μs to turn back on. This is legal. The IP circuit then sends a new LTR 1823 with a 50 μs latency. The firmware processes the LTR for a time 1824 and then changes the latency/power level over another period of time 1825. To operate as a "backstop", a timer is started 1831 when the firmware begins processing the LTR and ends only when the firmware finishes when the firmware has ended processing the new LTR and change to the resource state 1825 has begun. This results in a new latency/power state 1826. This is legal. The IP circuit then sends a new LTR 1827 with a 10 μs latency. The firmware processes the LTR for a time 1828. A timer is started 1833 when the firmware begins processing the LTR and ends at a predetermined threshold time 1834. Upon expiration, the hardware intervenes and commences to change the resource state 1829. This results in a new latency/power state 1830 and avoids any violation that would have occurred 1835 had the firmware operated without the hardware backstop.

Figure 17A:
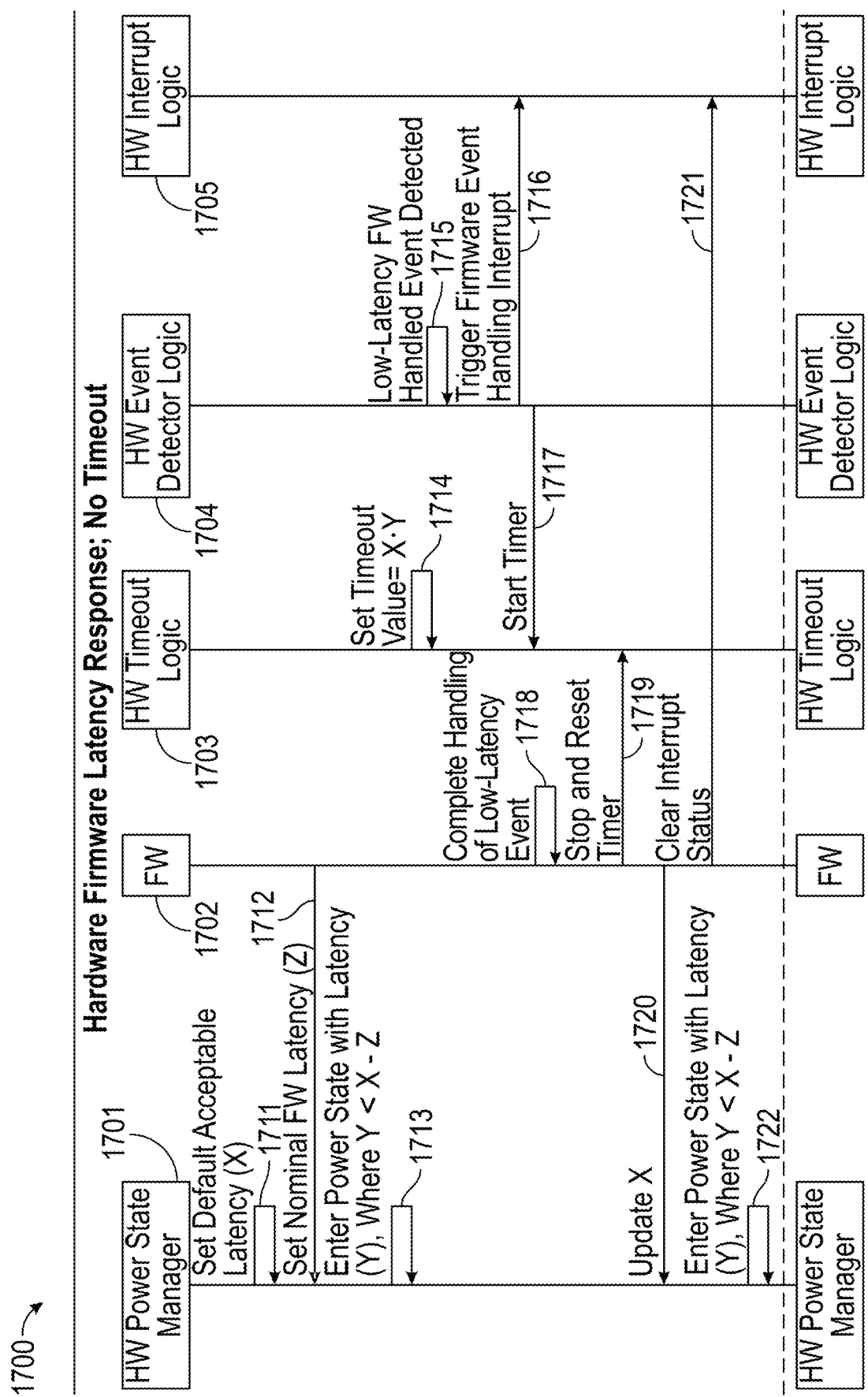
FIGS. 17A and 17B are diagrams illustrating interplay between firmware and hardware in a process for handling latency reporting in an embodiment of the present invention.
Figure 17B:
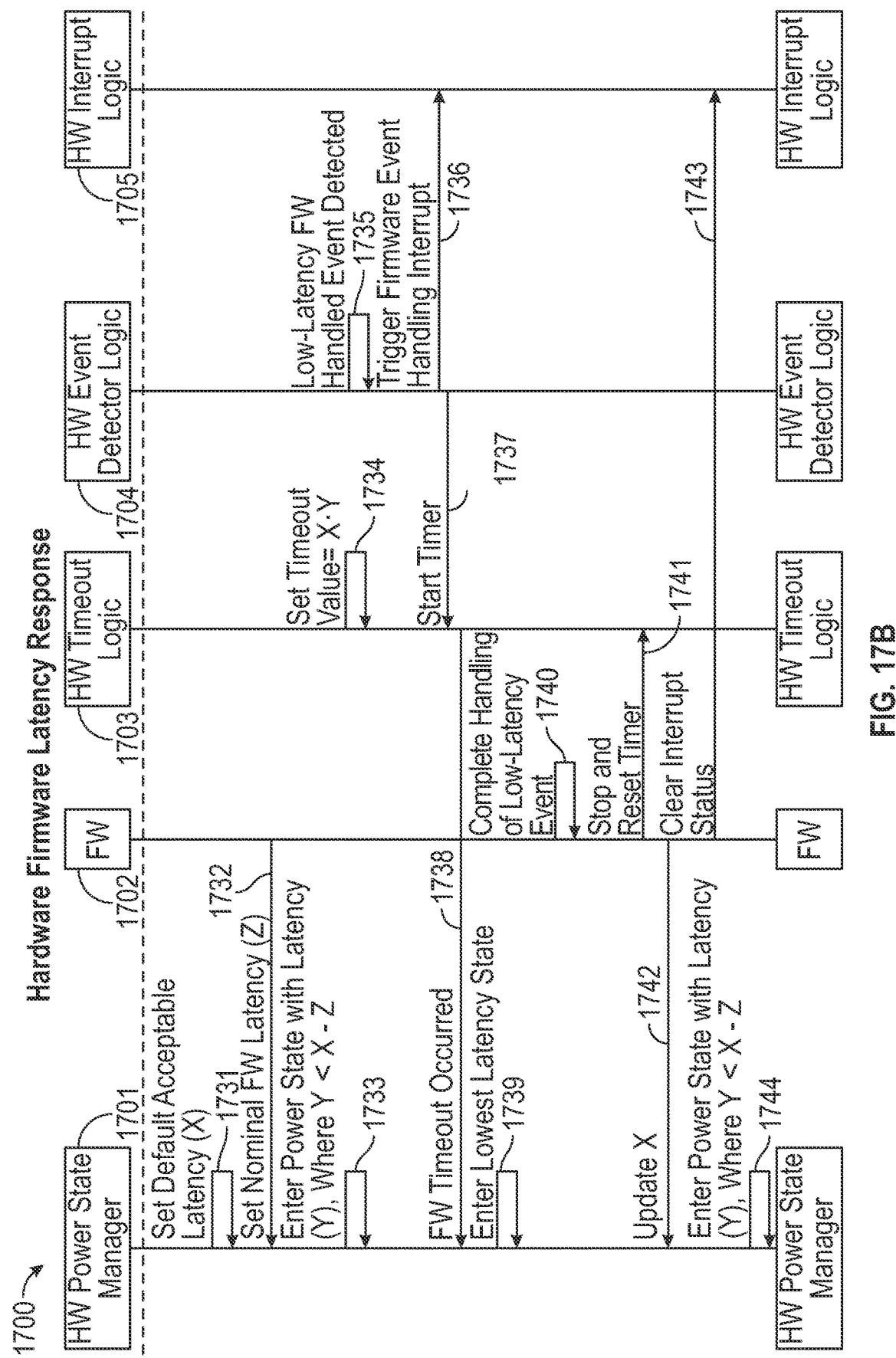

FIGS. 17A and 17B illustrate a method 1700 for handling LTRs using both firmware and hardware. Embodiments of the invention will be discussed in light of FIGS. 17A and 17B.

Figure 19:
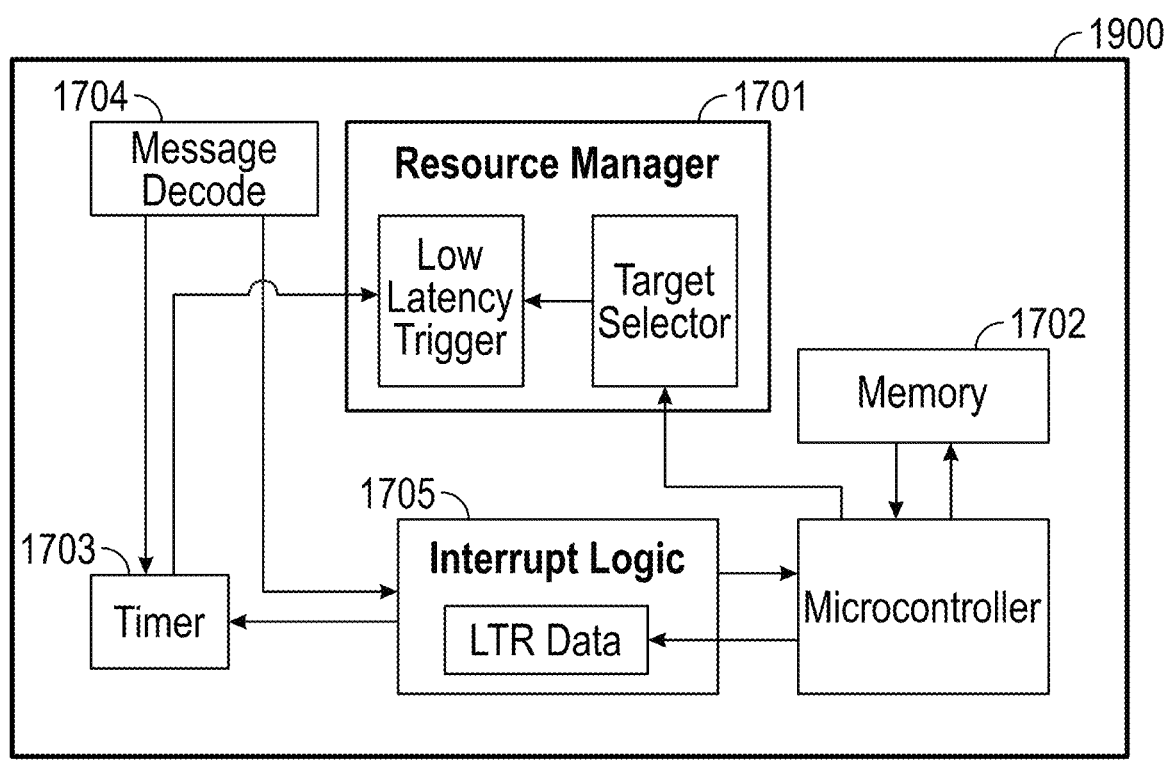
FIG. 19 is an embodiment of a platform power management controller (PMC) in an embodiment.

An embodiment includes a system comprising hardware logic and firmware coupled to the hardware logic. Hardware (HW) logic includes logic implemented at least in part in hardware, such as HW power state manager 1701, HW timeout logic 1703, HW event detector logic 1704, and/or HW interrupt logic 1705. Such logic may be spread across one or more modules. Such logic may be included in hardware, such as a hardware component of PMC 1900 of FIG. 19. PCU 138 (FIG. 1) may communicate with PMC 1900 (FIG. 19). For example, the PCU may provide voltage information to the PMC. The PMC may be coupled to the processor via a voltage rail, bus, and the like. Regarding FIG. 19, PMC 1900 includes, in an embodiment, HW event detector logic 1704 (Message Decode). Logic 1704 communicates with HW timeout logic 1703 (Timer) and HW interrupt logic 1705 (Interrupt Logic). Firmware 1702 may be included in memory, which couples to a microcontroller of PMC 1900. The microcontroller may communicate with HW power state manager 1701 (Resource Manager), which may include a target selector which determines the most optimal state with respect to power and performance for each resource and low latency trigger which moves resources to their lowest latency state when necessary to ensure LTR is satisfied.

The hardware logic is to receive a first LTR corresponding to an IP core and the hardware logic is to receive a second LTR (1715) corresponding to the IP core. Element 1715 illustrates how hardware logic may be configured to detect low-latency firmware handled events, such as an LTR. In the example of FIG. 17A, the second LTR has a lower latency tolerance than the first LTR.

The IP core may include, for example, at least one of a phase lock loop (PLL), a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof. While in various embodiments the IP core to which the LTR relates may include any or all of the elements mentioned immediately above, in still other embodiments the IP core may be an IP core whose LTR handling is managed by the PMC on behalf of the IP core. Whereas, if the elements existed in the IP core it may be possible/likely that the IP core would know the latencies and manage the resources on its own based on their LTRs.

Evidence of the first LTR may be found at element 1711. However, element 1711 may also indicate a default latency value that an IP core has for a resource. That value may then be altered by LTRs. Regarding element 1711, it may be followed by element 1712 whereby firmware communicates to hardware logic a nominal latency value the firmware has for processing LTRs. The X and Z values may then be processed in cooperation with a Y value in element 1713. The Y value may be start up time, such as the 80 μs startup time for the PLL mentioned in the example(s) above. Thus, for a situation where X=100 μs, Z=10 μs, and Y=80 μs, a power state may be entered because X−Z (100 μs−10 μs) is greater than Y. Power states may include, for example, states such as the P (processor) and C (core) power states mentioned above.

Regarding firmware, as used herein firmware is a class of computer software that provides the low-level control for a device's hardware. Firmware can, for example, provide a standardized operating environment for the device's software (allowing more hardware-independence), or, for less complex devices, act as the device's complete operating system, performing all control, monitoring and data manipulation functions. Typical examples of devices containing firmware are embedded systems, consumer appliances, computers, computer peripherals, and others. Firmware may be held in non-volatile memory devices such as ROM, EPROM, or flash memory. Changing the firmware of a device was rarely or never done during its lifetime in the past but is now a more common procedure. Some firmware memory devices are permanently installed and cannot be changed after manufacture. Common reasons for updating firmware include fixing bugs or adding features to the device. This may require ROM integrated circuits to be physically replaced or flash memory to be reprogrammed through a special procedure. Firmware such as the ROM BIOS of a personal computer may contain only elementary basic functions of a device and may only provide services to higher-level software. Firmware such as the program of an embedded system may be the only program that will run on the system and provide all of its functions.

In response to receiving the second LTR, the hardware logic is to begin a predetermined timed session (1717) having a start time and an end time. The start and stop times may have been determined in element 1714. In element 1714 the length of the session may be based on X −Z. However, in other embodiments the length of the session may be determined using other criteria. In element 1716 the hardware logic may issue an interrupt in response to detecting the LTR in element 1715. In some embodiments, if this interrupt is not cleared by the firmware by the end of the timed session, the hardware will raise the power state of the resource targeted by the LTR. Thus, the hardware logic is to detect arrival of the second LTR and in response to detecting arrival of the second LTR, the hardware logic is to communicate an interrupt (element 1716) and start the predetermined timed session (element 1717).

The hardware logic is to determine the firmware has completed processing the second LTR before occurrence of the end time. This recognition may be evidenced in several ways. For example, at the firmware completes processing the LTR in element 1718, the firmware may stop and reset the time (element 1719) and clear the interrupt (element 1721). Further, the firmware may update the hardware logic with a new X value (element 1720), whereby the latency value (X) is associated with the second LTR. Any of elements 1719, 1720, 1721 may provide evidence to hardware logic the firmware is done processing the LTR. In other words, determining the firmware has completed processing the second LTR includes the hardware logic determining the firmware has cleared an interrupt (element 1721). The interrupt of element 1716 is generated in response to the hardware logic receiving the a second LTR.

In response to determining the firmware has completed processing the second LTR before occurrence of the end time, the hardware logic is to decrease a power state corresponding to a resource (element 1722). The decision to decrease the power state may include the same calculation addressed with element 1713 albeit with an updated X value from the newly processed LTR. Therefore, in response to an updated latency value (e.g., X from element 1722) communicated from the firmware to the hardware logic, the hardware logic is to decrease the power state corresponding to the resource. Further, in response to an additional latency value (e.g., Z from element 1722) communicated from the firmware to the hardware logic, the hardware logic is to decrease the power state corresponding to the resource. Further, in response to a latency value (e.g., Y from element 1722) associated with the IP core, the hardware logic is to decrease the power state corresponding to the IP core. (While the above example concerns a specific fact pattern, other embodiments are not so limited may (instead of decreasing a power state in response to determining the firmware has completed processing the second LTR before occurrence of the end time) merely re-evaluate a power state, potentially increasing or decreasing the power state in response to determining the firmware has completed processing the second LTR before occurrence of the end time).

In an embodiment of the invention, the resource includes at least one of a phase lock loop (PLL), a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof.

While FIG. 17A addressed the firmware successfully processing an LTR before the timed session expires, FIG. 17B addresses where the firmware fails to successfully process an LTR before the timed session expires. Elements 1731, 1732, 1733, are analogous to elements 1711, 1712, 1713 and will not be addressed again for purposes of brevity. However, in the following example elements 1731, 1732, 1733 are omitted and it is assumed FIG. 17B has element 1734 follow element 1722 of FIG. 17A, with element 1734 using the X value of element 1720 and the Y value of element 1713.

In FIG. 17B, the hardware logic is to receive a third LTR corresponding to the IP core (element 1735), the third LTR having a lower latency tolerance than the first LTR. Again, the hardware logic may be configured to detect the arrival of the LTR at element 1735 and issue an interrupt (element 1736) similarly to element 1716. In response to receiving the third LTR, the hardware logic is to begin an additional predetermined timed session (1737) having an additional start time and an additional end time. In element 1738 the hardware logic is to determine the firmware has not completed processing the third LTR before occurrence of the additional end time. In response to determining the firmware has not completed processing the third LTR before occurrence of the additional end time, the hardware logic is to increase the power state corresponding to the resource (element 1739). The state may be the lowest latency state available. Thus, regarding element 1738 in response to a message communicated from the hardware logic (element 1738), the hardware logic is to increase the power state corresponding to the resource (and the message is not communicated from the firmware).

Despite the hardware logic performing "backstop" functions in element 1739, the firmware may continue to process the LTR until processing completion (element 1740). The firmware may still stop and reset the timer (element 1741), clear the interrupt (element 1743) of element 1736, and update the X value (element 1744). The update X value may then be used to possibly alter power states. For example, in response to the firmware reporting the latency value to the hardware logic (element 1742), the hardware logic is to decrease the power state corresponding to the IP core (element 1744). As used herein, to raise a power state may be used interchangeably with lowering a latency state. Thus, the firmware is to complete processing the third LTR (element 1740) despite the hardware logic already having increased the power state corresponding to the IP core (element 1739); and in response to the firmware having completed processing the third LTR, the firmware is to report a latency value to hardware logic (element 1742), wherein the latency value is associated with the third LTR.

As noted above, the additional predetermined timed session (element 1737) is based on at least one of a latency value associated with the second LTR (such as the X in element 1734) or a latency value associated with an additional LTR. In other words, X in the above example for element 1734 may be from the LTR of element 1715 but in other embodiments that is not necessarily the case. Regarding the X conveyed in element 1715, the firmware (element 1720) eventually communicates the latency value to the hardware logic. Further, the additional predetermined timed session (element 1737) is based on a latency value associated with the IP core, such as the Y value of element 1734.

In an embodiment of the invention, the hardware logic is to receive an additional LTR that corresponds to an additional IP core (or the same IP core in other embodiments). In response to receiving the additional LTR, the hardware logic is to begin another predetermined timed session having another start time and another end time wherein the predetermined timed session and the another predetermined timed session overlap one another. In other words, the firmware may be capable of processing multiple LTRs from multiple IP cores simultaneously. Thus, embodiments allow for handling more than one request (e.g., two competing read or write requests) instead of conventional systems that may focus on only a single highest priority request to the exclusion of other requests. This leaves lesser priority tasks un-serviced. In other words, in some conventional systems other LTRs trying to lower their latency cannot be serviced until other LTRs are serviced. This may result in a state violation similar to what happened in FIG. 18B.

Embodiments provide advantages over other LTR management schemes. For example, one such scheme may include making an LTR the highest priority interrupt and avoiding contention with other tasks. But there are other tasks/interrupts that are equally or more important than the LTR. Consequently, just making an LTR the highest priority would potentially starve those other tasks (which are equally or more important than the LTR) and therefore is not an ideal solution.

In an embodiment, the third LTR (element 1735) has a higher latency tolerance than the second LTR (element 1715). Further, the hardware logic receives the second LTR between receiving the first and third LTRs and the hardware logic is to receive no other LTR between the first and third LTRs except for the second LTR. Thus, FIG. 17B illustrates a situation where the third LTR is actually higher than the second LTR but nevertheless the power level is increased (element 1739) due to the timeout.

Thus, in an embodiment of the invention a hardware state machine performs an initial decode on an incoming request (e.g., a new LTR), starts a timer and triggers an interrupt to the firmware upon detecting a firmware-handled, latency sensitive task. If the timer expires before the firmware clears the interrupt status, the hardware takes corrective action via bringing the SoC to a low latency (and relatively high power consumption) state. This state, while power inefficient, ensures no violation of latency requirements. Such an embodiment allows implementation in firmware, which is changeable/tunable post-silicon (e.g., after a SoC has been shipped to customers), while avoiding concerns with functional failures that could result from firmware latencies which may not be universally below the required thresholds. The impact of firmware triggering the corrective action is a power increase instead of a functional failure or a hardware reset triggered by a watchdog timer.

The following examples pertain to further embodiments.

Example 1. A system comprising: hardware logic; and firmware to couple to the hardware logic; wherein: the hardware logic is to receive a first latency tolerance report (LTR) corresponding to an intellectual property (IP) core; the hardware logic is to receive a second LTR corresponding to the IP core, the second LTR having a lower latency tolerance than the first LTR; in response to receiving the second LTR, the hardware logic is to begin a predetermined timed session having a start time and an end time; the hardware logic is to determine the firmware has completed processing the second LTR before occurrence of the end time; in response to determining the firmware has completed processing the second LTR before occurrence of the end time, the hardware logic is to decrease a power state corresponding to a resource; the hardware logic is to receive a third LTR corresponding to the IP core, the third LTR having a lower latency tolerance than the first LTR; in response to receiving the third LTR, the hardware logic is to begin an additional predetermined timed session having an additional start time and an additional end time; the hardware logic is to determine the firmware has not completed processing the third LTR before occurrence of the additional end time; in response to determining the firmware has not completed processing the third LTR before occurrence of the additional end time, the hardware logic is to increase the power state corresponding to the resource.

Example 2. The system of example 1, wherein the additional predetermined timed session is based on at least one of a latency value associated with the second LTR or a latency value associated with an additional LTR.

Example 3. The system of example 2, wherein: the additional predetermined timed session is based on the latency value associated with the second LTR; the firmware is to communicate the latency value to the hardware logic.

Example 4. The system of example 1, wherein the additional predetermined timed session is based on a latency value associated with the IP core.

Example 5. The system of example 4 wherein: in response to an updated latency value communicated from the firmware to the hardware logic, the hardware logic is to decrease the power state corresponding to the resource.

Example 6. The system of example 5 wherein: in response to an additional latency value communicated from the firmware to the hardware logic, the hardware logic is to decrease the power state corresponding to the resource.

Example 7. The system of example 6 wherein: in response to a latency value associated with the IP core, the hardware logic is to decrease the power state corresponding to the IP core.

Example 8. The system of example 1, wherein determining the firmware has completed processing the second LTR includes the hardware logic determining the firmware has cleared an interrupt.

Example 9. The system of example 8, wherein the interrupt is generated in response to the hardware logic receiving the a second LTR.

Example 10. The system of example 8, wherein: the firmware is to report a latency value to the hardware logic; the latency value is associated with the second LTR.

Example 11. The system of example 1 wherein: in response to a message communicated from the hardware logic, the hardware logic is to increase the power state corresponding to the resource; wherein the message is not communicated from the firmware.

Example 12. The system of example 1 wherein: the hardware logic is to detect arrival of the second LTR; in response to detecting arrival of the second LTR, the hardware logic is to communicate an interrupt and start the predetermined timed session.

Example 13. The system of example 12 wherein: in response to the hardware logic communicating the interrupt, the firmware is to begin processing the second LTR.

Example 14. The system of example 1, wherein: the IP core includes at least one of a phase lock loop (PLL), a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof; the resource includes at least one of a PLL, a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof.

Example 15. The system of example 1 comprising a power management controller (PMC) included within the hardware logic, wherein: decreasing the power state includes the PMC decreasing the power state.

Example 16. The system of example 1 wherein: the firmware is to complete processing the third LTR despite the hardware logic already having increased the power state corresponding to the IP core; in response to the firmware having completed processing the third LTR, the firmware is to report a latency value to hardware logic, wherein the latency value is associated with the third LTR.

Example 17. The system of example 16 wherein: in response to the firmware reporting the latency value to the hardware logic, the hardware logic is to decrease the power state corresponding to the IP core.

Example 18. The system of example 1 wherein: the third LTR has a higher latency tolerance than the second LTR; the hardware logic is to receive the second LTR between receiving the first and third LTRs; the hardware logic is to receive no other LTR between the first and third LTRs except for the second LTR.

Example 1a. A system comprising: hardware logic; and firmware to couple to the hardware logic; wherein: the hardware logic is to receive a first latency tolerance report (LTR) corresponding to an intellectual property (IP) core; the hardware logic is to receive a second LTR corresponding to the IP core, the second LTR having a lower latency tolerance than the first LTR; in response to receiving the second LTR, the hardware logic is to begin a predetermined timed session having a start time and an end time; the hardware logic is to determine the firmware has completed processing the second LTR before occurrence of the end time; in response to determining the firmware has completed processing the second LTR before occurrence of the end time, the hardware logic is to increase a latency state corresponding to a resource; the hardware logic is to receive a third LTR corresponding to the IP core, the third LTR having a lower latency tolerance than the first LTR; in response to receiving the third LTR, the hardware logic is to begin an additional predetermined timed session having an additional start time and an additional end time; the hardware logic is to determine the firmware has not completed processing the third LTR before occurrence of the additional end time; in response to determining the firmware has not completed processing the third LTR before occurrence of the additional end time, the hardware logic is to decrease the latency state corresponding to the resource.

In an embodiment software may be employed to perform the same functions as the firmware in any of examples 1a to 25a.

Example 2a. The system of example 1a, wherein the additional predetermined timed session is based on at least one of a latency value associated with the second LTR or a latency value associated with an additional LTR.

Example 3a. The system of example 2a, wherein: the additional predetermined timed session is based on the latency value associated with the second LTR; the firmware is to communicate the latency value to the hardware logic.

Example 4a. The system of example 1a, wherein the additional predetermined timed session is based on a latency value associated with the IP core.

Example 5a. The system of example 4a wherein: in response to an updated latency value communicated from the firmware to the hardware logic, the hardware logic is to increase the latency state corresponding to the resource.

Example 5a". The system according to any of examples 1a-4a wherein: in response to an updated latency value communicated from the firmware to the hardware logic, the hardware logic is to increase the latency state corresponding to the resource.

Example 6a. The system of example 5a wherein: in response to an additional latency value communicated from the firmware to the hardware logic, the hardware logic is to increase the latency state corresponding to the resource.

Example 6a." The system according to any of examples 1a-5a wherein: in response to an additional latency value communicated from the firmware to the hardware logic, the hardware logic is to increase the latency state corresponding to the resource.

Example 7a. The system of example 6a wherein: in response to a latency value associated with the IP core, the hardware logic is to increase the latency state corresponding to the IP core.

Example 7a". The system according to any of examples 1a-6a wherein: in response to a latency value associated with the IP core, the hardware logic is to increase the latency state corresponding to the IP core.

Example 8a. The system of example 1a, wherein determining the firmware has completed processing the second LTR includes the hardware logic determining the firmware has cleared an interrupt.

Example 8a". The system according to any of examples 1a-7a, wherein determining the firmware has completed processing the second LTR includes the hardware logic determining the firmware has cleared an interrupt.

Example 9a. The system of example 8a, wherein the interrupt is generated in response to the hardware logic receiving the a second LTR.

Example 10a. The system of example 8a, wherein: the firmware is to report a latency value to the hardware logic; the latency value is associated with the second LTR.

Example 11a. The system of example 1a wherein: in response to a message communicated from the hardware logic, the hardware logic is to decrease the latency state corresponding to the resource; wherein the message is not communicated from the firmware.

Example 11a". The system according to any of examples 1a-10a wherein: in response to a message communicated from the hardware logic, the hardware logic is to decrease the latency state corresponding to the resource; wherein the message is not communicated from the firmware.

Example 12a. The system of example 1a wherein: the hardware logic is to detect arrival of the second LTR; in response to detecting arrival of the second LTR, the hardware logic is to communicate an interrupt and start the predetermined timed session.

Example 12a". The system according to any of examples 1a-11a wherein: the hardware logic is to detect arrival of the second LTR; in response to detecting arrival of the second LTR, the hardware logic is to communicate an interrupt and start the predetermined timed session.

Example 13a. The system of example 12a wherein: in response to the hardware logic communicating the interrupt, the firmware is to begin processing the second LTR.

Example 13a". The system according to any of examples 1a-12a wherein: in response to the hardware logic communicating the interrupt, the firmware is to begin processing the second LTR.

Example 14a. The system of example 1a, wherein: the IP core includes at least one of a phase lock loop (PLL), a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof; the resource includes at least one of a PLL, a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof.

Example 14a". The system according to any of examples 1a-13a, wherein: the IP core includes at least one of a phase lock loop (PLL), a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof; the resource includes at least one of a PLL, a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof.

Example 15a. The system of example 1a comprising a power management controller (PMC) included within the hardware logic, wherein: increasing the latency state includes the PMC increasing the latency state.

Example 15a". The system according to any of examples 1a-14a comprising a power management controller (PMC) included within the hardware logic, wherein: increasing the latency state includes the PMC increasing the latency state.

Example 16a. The system of example 1a wherein: the firmware is to complete processing the third LTR despite the hardware logic already having decreased the latency state corresponding to the IP core; in response to the firmware having completed processing the third LTR, the firmware is to report a latency value to hardware logic, wherein the latency value is associated with the third LTR.

Example 16a". The system according to any of examples 8a-9a, 11a-15a wherein: the firmware is to complete processing the third LTR despite the hardware logic already having decreased the latency state corresponding to the IP core; in response to the firmware having completed processing the third LTR, the firmware is to report a latency value to hardware logic, wherein the latency value is associated with the third LTR.

Example 17a. The system of example 16a wherein: in response to the firmware reporting the latency value to the hardware logic, the hardware logic is to increase the latency state corresponding to the IP core.

Example 18a. The system of example 1a wherein: the third LTR has a higher latency tolerance than the second LTR; the hardware logic is to receive the second LTR between receiving the first and third LTRs; the hardware logic is to receive no other LTR between the first and third LTRs except for the second LTR.

Example 18a". The system according to any of examples 1a-12a wherein: the third LTR has a higher latency tolerance than the second LTR; the hardware logic is to receive the second LTR between receiving the first and third LTRs; the hardware logic is to receive no other LTR between the first and third LTRs except for the second LTR.

Example 19a. A system comprising: hardware logic coupled to firmware, wherein the hardware logic is to: receive first and second communications corresponding to an intellectual property (IP) core and begin a timed session in response to receiving the second communication; determine the firmware has completed processing the second communication before expiration of the timed session and increase a latency state corresponding to a resource in response to determining the firmware has completed processing the second communication before expiration of the timed session; receive a third communication corresponding to the IP core and begin an additional timed session in response to receiving the third communication; determine the firmware failed to complete processing the third communication before expiration of the additional timed session and decrease the latency state corresponding to the resource in response to determining the firmware failed to complete processing the third communication before expiration of the additional timed session; wherein the first, second, and third communications are to respectively convey the IP core's first, second, and third tolerances for latency with respect to the resource.

Example 20a. The system of example 19a, wherein: the additional timed session is based on at least one of a latency value associated with the second communication or a latency value associated with an additional communication; the additional timed session is based on the latency value associated with the second communication; the firmware is to communicate the latency value to the hardware logic.

Example 21a. The system of example 19a, wherein: the additional timed session is based on a latency value associated with the IP core; in response to an updated latency value communicated from the firmware to the hardware logic, the hardware logic is to increase the latency state corresponding to the resource; in response to an additional latency value communicated from the firmware to the hardware logic, the hardware logic is to increase the latency state corresponding to the resource; in response to a latency value associated with the IP core, the hardware logic is to increase the latency state corresponding to the IP core.

Example 22a. The system of example 19a, wherein: determining the firmware has completed processing the second communication includes the hardware logic determining the firmware has processed an interrupt; the interrupt is generated in response to the hardware logic receiving the second communication; the firmware is to report a latency value to the hardware logic; the latency value is associated with the second communication.

Example 23a. The system of example 19a wherein: in response to a message communicated from the hardware logic, the hardware logic is to decrease the latency state corresponding to the resource; wherein the message is not communicated from the firmware.

Example 24a. The system of example 19a wherein: the hardware logic is to detect arrival of the second communication; in response to detecting arrival of the second communication, the hardware logic is to communicate an interrupt and start the timed session; in response to the hardware logic communicating the interrupt, the firmware is to begin processing the second communication.

Example 25a. The system of example 19a wherein: the firmware is to complete processing the third communication despite the hardware logic already having decreased the latency state corresponding to the IP core; in response to the firmware having completed processing the third communication, the firmware is to report a latency value to hardware logic, the latency value is associated with the third communication; in response to the firmware reporting the latency value to the hardware logic, the hardware logic is to increase the latency state corresponding to the IP core.

Example 1b. At least one machine-readable medium having stored thereon data which, if used by at least one machine, causes the at least one machine to perform operations comprising: receive a first latency tolerance report (LTR) corresponding to an intellectual property (IP) core; receive a second LTR corresponding to the IP core, the second LTR having a lower latency tolerance than the first LTR; in response to receiving the second LTR, begin a predetermined timed session having a start time and an end time; determine firmware has completed processing the second LTR before occurrence of the end time; in response to determining the firmware has completed processing the second LTR before occurrence of the end time, decrease a power state corresponding to the IP core; receive a third LTR corresponding to the IP core, the third LTR having a lower latency tolerance than the first LTR; in response to receiving the third LTR, begin an additional predetermined timed session having an additional start time and an additional end time; determine the firmware has not completed processing the third LTR before occurrence of the additional end time; in response to determining the firmware has not completed processing the third LTR before occurrence of the additional end time, increase the power state corresponding to the IP core.

Example 2b. The at least one machine-readable medium of example 1b, wherein the additional predetermined timed session is based on at least one of a latency value associated with the second LTR or a latency value associated with an additional LTR.

Example 3b. The at least one machine-readable medium of example 2b, wherein: the additional predetermined timed session is based on the latency value associated with the second LTR; the latency value is communicated from the firmware to hardware logic implemented in a system-on-a-chip.

Example 4b. The at least one machine-readable medium of example 1b, wherein the additional predetermined timed session is based on a latency value associated with the IP core.

Example 5b. The at least one machine-readable medium of example 4b, the operations comprising: in response to an updated latency value from the firmware, decrease the power state corresponding to the IP core.

Example 6b. The at least one machine-readable medium of example 5b, the operations comprising: in response to an additional latency value from the firmware, decrease the power state corresponding to the IP core.

Example 7b. The at least one machine-readable medium of example 6b, the operations comprising: in response to a latency value associated with the IP core, decrease the power state corresponding to the IP core.

Example 8b. The at least one machine-readable medium of example 1b, wherein determining the firmware has completed processing the second LTR includes determining the firmware has cleared an interrupt.

Example 9b. The at least one machine-readable medium of example 8b, wherein the interrupt is generated in response to receiving the a second LTR.

Example 10b. The at least one machine-readable medium of example 8b, the operations comprising the firmware reporting a latency value to hardware logic implemented in a system-on-a-chip, wherein the latency value is associated with the second LTR.

Example 11b. The at least one machine-readable medium of example 1b, the operations comprising: in response to a message communicated from hardware logic implemented in a system-on-a-chip, increase the power state corresponding to the IP core; wherein the message is not communicated from the firmware.

Example 12b. The at least one machine-readable medium of example 1b, the operations comprising: hardware logic implemented in a system-on-a-chip detecting arrival of the second LTR; in response to detecting arrival of the second LTR, the hardware logic communicating an interrupt and starting the predetermined timed session.

Example 13b. The at least one machine-readable medium of example 12b, the operations comprising: in response to the hardware logic communicating the interrupt, the firmware beginning processing the second LTR.

Example 14b. The at least one machine-readable medium of example 1b, wherein the IP core includes at least one of a phase lock loop (PLL), a memory, a receiver, a transmitter, a clock source, a voltage rail, a fabric, or a communications bus.

Example 15b. The at least one machine-readable medium of example 1b, wherein decreasing the power state includes a power management controller (PMC) decreasing the power state.

Example 16b. The at least one machine-readable medium of example 1b, the operations comprising: in response to increasing the power state corresponding to the IP core, determine the firmware has completed processing the third LTR; in response to determining the firmware has completed processing the third LTR, the firmware reporting a latency value to hardware logic implemented in a system-on-a-chip, wherein the latency value is associated with the third LTR.

Example 17b. The at least one machine-readable medium of example 16, the operations comprising: in response to the firmware reporting the latency value to the hardware logic, decrease the power state corresponding to the IP core.

Example 1b'. At least one machine-readable medium having stored thereon data which, if used by at least one machine, causes the at least one machine to perform operations comprising: receive a first latency tolerance report (LTR) corresponding to an intellectual property (IP) core; receive a second LTR corresponding to the IP core, the second LTR having a lower latency tolerance than the first LTR; in response to receiving the second LTR, begin a predetermined timed session having a start time and an end time; determine firmware has completed processing the second LTR before occurrence of the end time; in response to determining the firmware has completed processing the second LTR before occurrence of the end time, increase a latency state corresponding to the IP core; receive a third LTR corresponding to the IP core, the third LTR having a lower latency tolerance than the first LTR; in response to receiving the third LTR, begin an additional predetermined timed session having an additional start time and an additional end time; determine the firmware has not completed processing the third LTR before occurrence of the additional end time; in response to determining the firmware has not completed processing the third LTR before occurrence of the additional end time, decrease the latency state corresponding to the IP core.

Example 2b'. The at least one machine-readable medium of example 1b', wherein the additional predetermined timed session is based on at least one of a latency value associated with the second LTR or a latency value associated with an additional LTR.

Example 3b'. The at least one machine-readable medium of example 2b', wherein: the additional predetermined timed session is based on the latency value associated with the second LTR; the latency value is communicated from the firmware to hardware logic implemented in a system-on-a-chip.

Example 4b'. The at least one machine-readable medium of example 1b', wherein the additional predetermined timed session is based on a latency value associated with the IP core.

Example 5b'. The at least one machine-readable medium of example 4b', the operations comprising: in response to an updated latency value from the firmware, increase the latency state corresponding to the IP core.

Example 6b'. The at least one machine-readable medium of example 5b', the operations comprising: in response to an additional latency value from the firmware, increase the latency state corresponding to the IP core.

Example 7b'. The at least one machine-readable medium of example 6b', the operations comprising: in response to a latency value associated with the IP core, increase the latency state corresponding to the IP core.

Example 8b'. The at least one machine-readable medium of example 1b', wherein determining the firmware has completed processing the second LTR includes determining the firmware has cleared an interrupt.

Example 9b'. The at least one machine-readable medium of example 8b', wherein the interrupt is generated in response to receiving the a second LTR.

Example 10b'. The at least one machine-readable medium of example 8b', the operations comprising the firmware reporting a latency value to hardware logic implemented in a system-on-a-chip, wherein the latency value is associated with the second LTR.

Example 11b'. The at least one machine-readable medium of example 1b', the operations comprising: in response to a message communicated from hardware logic implemented in a system-on-a-chip, decrease the latency state corresponding to the IP core; wherein the message is not communicated from the firmware.

Example 12b'. The at least one machine-readable medium of example 1b', the operations comprising: hardware logic implemented in a system-on-a-chip detecting arrival of the second LTR; in response to detecting arrival of the second LTR, the hardware logic communicating an interrupt and starting the predetermined timed session.

Example 13b'. The at least one machine-readable medium of example 12b', the operations comprising: in response to the hardware logic communicating the interrupt, the firmware beginning processing the second LTR.

Example 14b'. The at least one machine-readable medium of example 1b', wherein the IP core includes at least one of a phase lock loop (PLL), a memory, a receiver, a transmitter, a clock source, a voltage rail, a fabric, or a communications bus.

Example 15b'. The at least one machine-readable medium of example 1b', wherein increasing the latency state includes a power management controller (PMC) increasing the latency state.

Example 16b'. The at least one machine-readable medium of example 1b', the operations comprising: in response to decreasing the latency state corresponding to the IP core, determine the firmware has completed processing the third LTR; in response to determining the firmware has completed processing the third LTR, the firmware reporting a latency value to hardware logic implemented in a system-on-a-chip, wherein the latency value is associated with the third LTR.

Example 17b'. The at least one machine-readable medium of example 16', the operations comprising: in response to the firmware reporting the latency value to the hardware logic, increase the latency state corresponding to the IP core.

Example 1c: The system according to any examples 1a-25a comprising a processor, a memory, and a communication module, coupled to the processor, to communicate with a computing node external to the system Example 1a'. A method comprising: hardware logic receiving a first latency tolerance report (LTR) corresponding to an intellectual property (IP) core; the hardware logic receiving a second LTR corresponding to the IP core, the second LTR having a lower latency tolerance than the first LTR; in response to receiving the second LTR, the hardware logic beginning a predetermined timed session having a start time and an end time; the hardware logic determining the firmware has completed processing the second LTR before occurrence of the end time; in response to determining the firmware has completed processing the second LTR before occurrence of the end time, the hardware logic increasing a latency state corresponding to a resource; the hardware logic receiving a third LTR corresponding to the IP core, the third LTR having a lower latency tolerance than the first LTR; in response to receiving the third LTR, the hardware logic beginning an additional predetermined timed session having an additional start time and an additional end time; the hardware logic determining the firmware has not completed processing the third LTR before occurrence of the additional end time; in response to determining the firmware has not completed processing the third LTR before occurrence of the additional end time, the hardware logic decreasing the latency state corresponding to the resource.

Example 2a'. The method of example 1 a', wherein the additional predetermined timed session is based on at least one of a latency value associated with the second LTR or a latency value associated with an additional LTR.

Example 3a'. The method of example 2a', wherein: the additional predetermined timed session is based on the latency value associated with the second LTR; the firmware communicating the latency value to the hardware logic.

Example 4a'. The method of example 1a', wherein the additional predetermined timed session is based on a latency value associated with the IP core.

Example 5a'. The method of example 4a' comprising in response to an updated latency value communicated from the firmware to the hardware logic, the hardware logic increasing the latency state corresponding to the resource.

Example 6a'. The method of example 5a' comprising in response to an additional latency value communicated from the firmware to the hardware logic, the hardware logic increasing the latency state corresponding to the resource.

Example 7a'. The method of example 6a' comprising in response to a latency value associated with the IP core, the hardware logic increasing the latency state corresponding to the IP core.

Example 8a'. The method of example 1a', wherein determining the firmware has completed processing the second LTR includes the hardware logic determining the firmware has cleared an interrupt.

Example 9a'. The method of example 8a', wherein the interrupt is generated in response to the hardware logic receiving the a second LTR.

Example 10a'. The method of example 8a' comprising the firmware reporting a latency value to the hardware logic; the latency value is associated with the second LTR.

Example 11a'. The method of example 1a' comprising in response to a message communicated from the hardware logic, the hardware logic decreasing the latency state corresponding to the resource; wherein the message is not communicated from the firmware.

Example 12a'. The method of example 1a' comprising the hardware logic detecting arrival of the second LTR; in response to detecting arrival of the second LTR, the hardware logic communicating an interrupt and start the predetermined timed session.

Example 13a'. The method of example 12a' comprising in response to the hardware logic communicating the interrupt, the firmware begins processing the second LTR.

Example 14a'. The method of example 1a', wherein: the IP core includes at least one of a phase lock loop (PLL), a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof; the resource includes at least one of a PLL, a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof.

Example 15a'. The method of example 1a' wherein increasing the latency state includes a PMC increasing the latency state.

Example 16a'. The method of example 1a' comprising the firmware completing processing the third LTR despite the hardware logic already having decreased the latency state corresponding to the IP core; in response to the firmware having completed processing the third LTR, the firmware reporting a latency value to hardware logic, wherein the latency value is associated with the third LTR.

Example 17a'. The method of example 16a' comprising in response to the firmware reporting the latency value to the hardware logic, the hardware logic increasing the latency state corresponding to the IP core.

Example 18a'. The method of example 1a' wherein: the third LTR has a higher latency tolerance than the second LTR; the method comprising the hardware logic receiving the second LTR between receiving the first and third LTRs; the hardware logic receiving no other LTR between the first and third LTRs except for the second LTR.

Example 19a'. A method comprising: hardware logic receiving first and second communications corresponding to an intellectual property (IP) core and beginning a timed session in response to receiving the second communication; determining the firmware has completed processing the second communication before expiration of the timed session and increasing a latency state corresponding to a resource in response to determining the firmware has completed processing the second communication before expiration of the timed session; receiving a third communication corresponding to the IP core and beginning an additional timed session in response to receiving the third communication; determining the firmware failed to complete processing the third communication before expiration of the additional timed session and decreasing the latency state corresponding to the resource in response to determining the firmware failed to complete processing the third communication before expiration of the additional timed session; wherein the first, second, and third communications are to respectively convey the IP core's first, second, and third tolerances for latency with respect to the resource.

Example 20a'. The method of example 19a', wherein: the additional timed session is based on at least one of a latency value associated with the second communication or a latency value associated with an additional communication; the additional timed session is based on the latency value associated with the second communication; the firmware communicating the latency value to the hardware logic.

Example 21a'. The method of example 19a', wherein: the additional timed session is based on a latency value associated with the IP core; the method comprising in response to an updated latency value communicated from the firmware to the hardware logic, the hardware logic increasing the latency state corresponding to the resource; in response to an additional latency value communicated from the firmware to the hardware logic, the hardware logic increasing the latency state corresponding to the resource; in response to a latency value associated with the IP core, the hardware logic increasing the latency state corresponding to the IP core.

Example 22a'. The method of example 19a', wherein: determining the firmware has completed processing the second communication includes the hardware logic determining the firmware has processed an interrupt; the interrupt is generated in response to the hardware logic receiving the second communication; the firmware reporting a latency value to the hardware logic; the latency value is associated with the second communication.

Example 23a'. The method of example 19a' comprising in response to a message communicated from the hardware logic, the hardware logic decreasing the latency state corresponding to the resource; wherein the message is not communicated from the firmware.

Example 24a'. The method of example 19a' comprising the hardware logic detecting arrival of the second communication; in response to detecting arrival of the second communication, the hardware logic communicating an interrupt and start the timed session; in response to the hardware logic communicating the interrupt, the firmware beginning processing the second communication.

Example 25a'. The method of example 19a' comprising the firmware completing processing the third communication despite the hardware logic already having decreased the latency state corresponding to the IP core; in response to the firmware having completed processing the third communication, the firmware reporting a latency value to hardware logic, the latency value is associated with the third communication; in response to the firmware reporting the latency value to the hardware logic, the hardware logic increasing the latency state corresponding to the IP core.

Example 26a'. At least one machine readable medium comprising a plurality of instructions that in response to being executed on a computing device, cause the computing device to carry out a method according to any one of examples 1a' to 25a'.

Example 27a'. A communications device arranged to carry out a method according to any one of examples 1a' to 25a'.

Example 28a'. An apparatus comprising means for performing any one of examples 1a' to 25a'.

Example 1d. A method comprising: hardware logic receiving a first latency tolerance report (LTR) corresponding to an intellectual property (IP) core; the hardware logic receiving a second LTR corresponding to the IP core, the second LTR having a lower latency tolerance than the first LTR; in response to receiving the second LTR, the hardware logic beginning a predetermined timed session having a start time and an end time; the hardware logic determining the firmware has completed processing the second LTR before occurrence of the end time; in response to determining the firmware has completed processing the second LTR before occurrence of the end time, the hardware logic increasing a latency state corresponding to a resource; the hardware logic receiving a third LTR corresponding to the IP core, the third LTR having a lower latency tolerance than the first LTR; in response to receiving the third LTR, the hardware logic beginning an additional predetermined timed session having an additional start time and an additional end time; the hardware logic determining the firmware has not completed processing the third LTR before occurrence of the additional end time; in response to determining the firmware has not completed processing the third LTR before occurrence of the additional end time, the hardware logic decreasing the latency state corresponding to the resource.

Example 2d. The method of example 1d, wherein the additional predetermined timed session is based on at least one of a latency value associated with the second LTR or a latency value associated with an additional LTR.

Example 3d. The method of example 1d, wherein the additional predetermined timed session is based on a latency value associated with the IP core.

Example 4d. The method of example 3d comprising, in response to an updated latency value communicated from the firmware to the hardware logic, the hardware logic increasing the latency state corresponding to the resource.

Example 5d. The method according to any of examples 3d-4d comprising in response to an additional latency value communicated from the firmware to the hardware logic, the hardware logic increasing the latency state corresponding to the resource.

Example 6d. The method according to any of examples 3d-5d comprising in response to a latency value associated with the IP core, the hardware logic increasing the latency state corresponding to the IP core.

Example 7d. The method according to any of examples 1d-6d, wherein: determining the firmware has completed processing the second LTR includes the hardware logic determining the firmware has cleared an interrupt; the interrupt is generated in response to the hardware logic receiving the a second LTR.

Example 8d. The method of example 7d comprising the firmware reporting a latency value to the hardware logic; the latency value is associated with the second LTR.

Example 9d. The method according to any of examples 1d-8d comprising in response to a message communicated from the hardware logic, the hardware logic decreasing the latency state corresponding to the resource; wherein the message is not communicated from the firmware.

Example 10d. The method according to any of examples 1d-9d comprising: the hardware logic detecting arrival of the second LTR; in response to detecting arrival of the second LTR, the hardware logic communicating an interrupt and start the predetermined timed session.

Example 11d. The method according to any of examples 3d-10d comprising: the firmware completing processing the third LTR despite the hardware logic already having decreased the latency state corresponding to the IP core; in response to the firmware having completed processing the third LTR, the firmware reporting a latency value to hardware logic, wherein the latency value is associated with the third LTR.

Example 12d. The method according to any of examples 1d-11d comprising, in response to the firmware reporting the latency value to the hardware logic, the hardware logic increasing the latency state corresponding to the IP core.

Example 13d. The method of example 1d wherein: the third LTR has a higher latency tolerance than the second LTR; the method comprises (a) the hardware logic receiving the second LTR between receiving the first and third LTRs; and (b) the hardware logic receiving no other LTR between the first and third LTRs except for the second LTR.

Example 14d. At least one machine readable medium comprising a plurality of instructions that in response to being executed on a computing device, cause the computing device to carry out a method according to any one of examples 1d to 13d.

Example 15d. An apparatus comprising means for performing any one of examples 1d to 13d.

Example 1e. A method comprising: hardware logic receiving a first latency tolerance report (LTR) corresponding to an intellectual property (IP) core; the hardware logic receiving a second LTR corresponding to the IP core, the second LTR having a lower latency tolerance than the first LTR; in response to receiving the second LTR, the hardware logic beginning a predetermined timed session having a start time and an end time; the hardware logic determining the firmware has completed processing the second LTR before occurrence of the end time; in response to determining the firmware has completed processing the second LTR before occurrence of the end time, the hardware logic increasing a latency state corresponding to a resource; the hardware logic receiving a third LTR corresponding to the IP core, the third LTR having a lower latency tolerance than the first LTR; in response to receiving the third LTR, the hardware logic beginning an additional predetermined timed session having an additional start time and an additional end time; the hardware logic determining the firmware has not completed processing the third LTR before occurrence of the additional end time; in response to determining the firmware has not completed processing the third LTR before occurrence of the additional end time, the hardware logic decreasing the latency state corresponding to the resource.

Example 2e. The method of example 1e, wherein the additional predetermined timed session is based on at least one of a latency value associated with the second LTR or a latency value associated with an additional LTR.

Example 3e. The method of example 1e, wherein the additional predetermined timed session is based on a latency value associated with the IP core.

Example 4e. The method of example 3e comprising, in response to an updated latency value communicated from the firmware to the hardware logic, the hardware logic increasing the latency state corresponding to the resource.

Example 5e. The method according to any of examples 3e-4e comprising in response to an additional latency value communicated from the firmware to the hardware logic, the hardware logic increasing the latency state corresponding to the resource.

Example 6e. The method of example 5e comprising in response to a latency value associated with the IP core, the hardware logic increasing the latency state corresponding to the IP core.

Example 7e. The method according to any of examples 1e-4e, wherein: determining the firmware has completed processing the second LTR includes the hardware logic determining the firmware has cleared an interrupt; the interrupt is generated in response to the hardware logic receiving the a second LTR.

Example 8e. The method of example 7e comprising the firmware reporting a latency value to the hardware logic; the latency value is associated with the second LTR.

Example 9e. The method according to any of examples 1e-4e comprising in response to a message communicated from the hardware logic, the hardware logic decreasing the latency state corresponding to the resource; wherein the message is not communicated from the firmware.

Example 10e. The method according to any of examples 1e-4e comprising: the hardware logic detecting arrival of the second LTR; in response to detecting arrival of the second LTR, the hardware logic communicating an interrupt and start the predetermined timed session.

Example 11e. The method according to any of examples 1e-4e comprising: the firmware completing processing the third LTR despite the hardware logic already having decreased the latency state corresponding to the IP core; in response to the firmware having completed processing the third LTR, the firmware reporting a latency value to hardware logic, wherein the latency value is associated with the third LTR.

Example 12e. The method of example 11e comprising, in response to the firmware reporting the latency value to the hardware logic, the hardware logic increasing the latency state corresponding to the IP core.

Example 13e. The method of example 1e wherein: the third LTR has a higher latency tolerance than the second LTR; the method comprises (a) the hardware logic receiving the second LTR between receiving the first and third LTRs; and (b) the hardware logic receiving no other LTR between the first and third LTRs except for the second LTR.

Example 14e. At least one machine readable medium comprising a plurality of instructions that in response to being executed on a computing device, cause the computing device to carry out a method according to any one of examples 1e to 13e.

Example 15e. An apparatus comprising means for performing any one of examples 1e to 13e.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   hardware logic; and
   firmware to couple to the hardware logic;
   wherein:
   the hardware logic is to receive a first latency tolerance report (LTR) corresponding to an intellectual property (IP) core;
   the hardware logic is to receive a second LTR corresponding to the IP core, the second LTR having a lower latency tolerance than the first LTR;
   in response to receiving the second LTR, the hardware logic is to begin a predetermined timed session having a start time and an end time;
   the hardware logic is to determine the firmware has completed processing the second LTR before occurrence of the end time;
   in response to determining the firmware has completed processing the second LTR before occurrence of the end time, the hardware logic is to increase a latency state corresponding to a resource;
   the hardware logic is to receive a third LTR corresponding to the IP core, the third LTR having a lower latency tolerance than the first LTR;

in response to receiving the third LTR, the hardware logic is to begin an additional predetermined timed session having an additional start time and an additional end time;

the hardware logic is to determine the firmware has not completed processing the third LTR before occurrence of the additional end time;

in response to determining the firmware has not completed processing the third LTR before occurrence of the additional end time, the hardware logic is to decrease the latency state corresponding to the resource.

2. The system of claim 1, wherein the additional predetermined timed session is based on at least one of a latency value associated with the second LTR or a latency value associated with an additional LTR.

3. The system of claim 2, wherein:
the additional predetermined timed session is based on the latency value associated with the second LTR;
the firmware is to communicate the latency value to the hardware logic.

4. The system of claim 1, wherein the additional predetermined timed session is based on a latency value associated with the IP core.

5. The system of claim 4 wherein:
in response to an updated latency value communicated from the firmware to the hardware logic, the hardware logic is to increase the latency state corresponding to the resource.

6. The system of claim 5 wherein:
in response to an additional latency value communicated from the firmware to the hardware logic, the hardware logic is to increase the latency state corresponding to the resource.

7. The system of claim 6 wherein:
in response to another latency value associated with the IP core, the hardware logic is to increase the latency state corresponding to the IP core.

8. The system of claim 1, wherein determining the firmware has completed processing the second LTR includes the hardware logic determining the firmware has cleared an interrupt.

9. The system of claim 8, wherein the interrupt is generated in response to the hardware logic receiving the a second LTR.

10. The system of claim 8, wherein:
the firmware is to report a latency value to the hardware logic;
the latency value is associated with the second LTR.

11. The system of claim 1 wherein:
in response to a message communicated from the hardware logic, the hardware logic is to decrease the latency state corresponding to the resource;
wherein the message is not communicated from the firmware.

12. The system of claim 1 wherein:
the hardware logic is to detect arrival of the second LTR;
in response to detecting arrival of the second LTR, the hardware logic is to communicate an interrupt and start the predetermined timed session.

13. The system of claim 12 wherein:
in response to the hardware logic communicating the interrupt, the firmware is to begin processing the second LTR.

14. The system of claim 1, wherein:
the IP core includes at least one of a phase lock loop (PLL), a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof;

the resource includes at least one of a PLL, a memory, a receiver, a transmitter, a transceiver, a clock source, a voltage rail, a power plane, a fabric, a processor, a controller, a processor core, a voltage regulator, a sensor, a fan, a communications bus, a voltage regulator, a processor domain, a processing element, a processing unit, a hardware thread, a coder, or combinations thereof.

15. The system of claim 1 comprising a power management controller (PMC) included within the hardware logic, wherein:
increasing the latency state includes the PMC increasing the latency state.

16. The system of claim 1 wherein:
the firmware is to complete processing the third LTR despite the hardware logic already having decreased the latency state corresponding to the IP core;
in response to the firmware having completed processing the third LTR, the firmware is to report a latency value to hardware logic,
wherein the latency value is associated with the third LTR.

17. The system of claim 16 wherein:
in response to the firmware reporting the latency value to the hardware logic, the hardware logic is to increase the latency state corresponding to the IP core.

18. The system of claim 1 wherein:
the third LTR has a higher latency tolerance than the second LTR;
the hardware logic is to receive the second LTR between receiving the first and third LTRs;
the hardware logic is to receive no other LTR between the first and third LTRs except for the second LTR.

19. A system comprising:
hardware logic coupled to firmware, wherein the hardware logic is to:
receive first and second communications corresponding to an intellectual property (IP) core and begin a timed session in response to receiving the second communication;
determine the firmware has completed processing the second communication before expiration of the timed session and decrease a power state corresponding to a resource in response to determining the firmware has completed processing the second communication before expiration of the timed session;
receive a third communication corresponding to the IP core and begin an additional timed session in response to receiving the third communication;
determine the firmware failed to complete processing the third communication before expiration of the additional timed session and increase the power state corresponding to the resource in response to determining the firmware failed to complete processing the third communication before expiration of the additional timed session;
wherein the first, second, and third communications are to respectively convey the IP core's first, second, and third tolerances for latency with respect to the resource.

20. The system of claim 19, wherein:

the additional timed session is based on at least one of a latency value associated with the second communication or a latency value associated with an additional communication;

the firmware is to communicate the latency value to the hardware logic.

21. The system of claim 19, wherein:

the additional timed session is based on a latency value associated with the IP core;

in response to an updated latency value communicated from the firmware to the hardware logic, the hardware logic is to decrease the power state corresponding to the resource;

in response to an additional latency value communicated from the firmware to the hardware logic, the hardware logic is to decrease the power state corresponding to the resource;

in response to a latency value associated with the IP core, the hardware logic is to decrease the power state corresponding to the IP core.

22. The system of claim 19, wherein:

determining the firmware has completed processing the second communication includes the hardware logic determining the firmware has processed an interrupt;

the interrupt is generated in response to the hardware logic receiving the second communication;

the firmware is to report a latency value to the hardware logic;

the latency value is associated with the second communication.

23. The system of claim 19 wherein:

in response to a message communicated from the hardware logic, the hardware logic is to increase the power state corresponding to the resource;

wherein the message is not communicated from the firmware.

24. The system of claim 19 wherein:

the hardware logic is to detect arrival of the second communication;

in response to detecting arrival of the second communication, the hardware logic is to communicate an interrupt and start the timed session;

in response to the hardware logic communicating the interrupt, the firmware is to begin processing the second communication.

25. The system of claim 19 wherein:

the firmware is to complete processing the third communication despite the hardware logic already having increased the power state corresponding to the IP core;

in response to the firmware having completed processing the third communication, the firmware is to report a latency value to hardware logic;

the latency value is associated with the third communication;

in response to the firmware reporting the latency value to the hardware logic, the hardware logic is to decrease the power state corresponding to the IP core.

* * * * *